(12) United States Patent
Feinstein

(10) Patent No.: US 11,625,162 B2
(45) Date of Patent: Apr. 11, 2023

(54) GEOLOGIC FORMATION OPERATIONS FRAMEWORK

(71) Applicant: Schlumberger Technology Corporation, Sugar Land, TX (US)

(72) Inventor: Oren Feinstein, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/593,817

(22) PCT Filed: Mar. 25, 2020

(86) PCT No.: PCT/US2020/024636
§ 371 (c)(1),
(2) Date: Sep. 24, 2021

(87) PCT Pub. No.: WO2020/198310
PCT Pub. Date: Oct. 1, 2020

(65) Prior Publication Data
US 2022/0197490 A1    Jun. 23, 2022

Related U.S. Application Data

(60) Provisional application No. 62/824,418, filed on Mar. 27, 2019.

(51) Int. Cl.
G06F 3/048      (2013.01)
G06F 3/04847    (2022.01)
G06F 40/186     (2020.01)
E21B 49/00      (2006.01)

(52) U.S. Cl.
CPC ........ G06F 3/04847 (2013.01); G06F 40/186 (2020.01); E21B 49/00 (2013.01); *E21B 2200/20* (2020.05)

(58) Field of Classification Search
None
See application file for complete search history.

(56) References Cited

U.S. PATENT DOCUMENTS

| | | | |
|---|---|---|---|
| 5,873,049 A | 2/1999 | Bielak et al. | |
| 7,685,605 B1 * | 3/2010 | Ahmed | G06F 9/542 719/318 |
| 10,073,679 B2 | 9/2018 | Straub et al. | |

(Continued)

FOREIGN PATENT DOCUMENTS

WO    2009032416 A1    3/2009

OTHER PUBLICATIONS

International Search Report and Written Opinion of related International Patent Application No. PCT/US2020/024636 dated Jul. 9, 2020.

(Continued)

*Primary Examiner* — Howard Cortes

(57) ABSTRACT

A method can include rendering a graphical user interface (GUI) to a display where the GUI includes graphical controls that correspond to windows and objects of a computational framework and a windows builder panel; responsive to receipt of instructions via the graphical controls, generating specifications for the windows and the objects; and storing the specifications for the windows and the objects as a template file.

17 Claims, 23 Drawing Sheets

(56) References Cited

U.S. PATENT DOCUMENTS

| | | | |
|---|---|---|---|
| 2003/0028269 A1* | 2/2003 | Spriggs | G06Q 10/087 700/83 |
| 2009/0158134 A1* | 6/2009 | Wang | G06F 40/103 715/222 |
| 2009/0225630 A1 | 9/2009 | Zheng et al. | |
| 2011/0218775 A1* | 9/2011 | Czernuszenko | G06F 30/00 703/1 |
| 2012/0254781 A1* | 10/2012 | Larsen | G01V 1/282 715/765 |
| 2013/0047107 A1* | 2/2013 | O'Meara | G06Q 40/08 715/810 |
| 2013/0191091 A1 | 7/2013 | Fung et al. | |
| 2013/0205219 A1 | 8/2013 | Moha et al. | |
| 2013/0327521 A1 | 12/2013 | Menon et al. | |
| 2014/0053091 A1 | 2/2014 | Hou et al. | |
| 2014/0353033 A1 | 12/2014 | Pink et al. | |
| 2015/0168949 A1* | 6/2015 | Hua | G05B 23/0216 702/188 |
| 2015/0184508 A1* | 7/2015 | Huang | E21B 7/061 703/6 |
| 2017/0090742 A1* | 3/2017 | Ade | G01B 5/012 |
| 2018/0051552 A1* | 2/2018 | Li | E21B 7/04 |
| 2018/0075544 A1* | 3/2018 | Passolt | E21B 49/00 |
| 2018/0087351 A1* | 3/2018 | Johnston | E21B 10/00 |
| 2019/0078425 A1 | 3/2019 | Gillan | |
| 2020/0272292 A1 | 8/2020 | Spolnicki et al. | |

OTHER PUBLICATIONS

International Preliminary Report on Patentability of related International Patent Application No. PCT/US2020/024636 dated Oct. 7, 2021, 8 pages.

Office Action issued in U.S. Appl. No. 16/646,310 dated Aug. 5, 2022, 35 pages.

Bello et al., Next Generation Downhole Big Data Platform for Dynamic Data-Driven Well and Reservoir Management:, SPE Reservoir Characterisation and Simulation Conference and Exhibition held in Abu Dhabi, UAE, May 8-10, 2017.

* cited by examiner

GEOLOGIC FORMATION OPERATIONS FRAMEWORK

RELATED APPLICATIONS

This application claims priority to and the benefit of a U.S. Provisional Application having Ser. No. 62/824,418, filed 27 Mar. 2019, which is incorporated by reference herein.

BACKGROUND

Various field operations can be performed with respect to a geologic formation. Such operations can include exploration operations, development operations, production operations, etc., with respect to a reservoir or reservoirs in the geologic formation.

As an example, an operation can be a seismic survey that utilizes equipment to acquire a seismic data set as measured and recorded with reference to a particular area of the Earth, for example, to evaluate a subsurface formation. A seismic survey can be acquired using one or more of surface, ocean/sea bottom, marine, borehole, land or other technology. A seismic survey can acquire a seismic data set or sets, which can be spatial (e.g., 1D, 2D or 3D) or spatial and temporal (e.g., 1D, 2D or 3D in space and 1D in time). Seismic data can be visualized by processing and rendering to a display where an interpreter can identify and select boundaries that can are representative of structure(s) in the Earth (e.g. reflectors, etc.).

As an example, an "Earth model" may be constructed using interpreted seismic data and optionally one or more other types of data. For example, consider constructing an Earth model that represents a reservoir using seismic data and exploratory borehole data and performing a simulation of physical phenomena (e.g., fluid flow, etc.) using a reservoir simulator. Results of a simulator can indicate a possible target that may be reached by drilling a borehole into the formation where the borehole can be completed to form a well that can produce fluid from the reservoir.

As an example, an operation can be a drilling operation where a borehole can be drilled into a geologic formation where the borehole may be utilized to form a well (e.g., via completions). As an example, an operation can be a logging operation, which may be a wireline logging operation, a logging while drilling operation or another type of logging operation. After a borehole is formed by drilling, a formation is exposed via the borehole, which provides an opportunity to utilize one or more logging tools to acquire measurements (e.g., via sensors) that can be processed to determine properties of the formation (e.g., rock properties, fluid properties, etc.). As an example, logging may be performed before, during or after casing, cementing, fracturing, treating, etc. As an example, a cased-hole logging tool may include equipment to measure fluid flow rates and/or one or more other production parameters in a wellbore or, for example, to examine integrity of a casing and/or cement.

A rig can be a system of components that can be operated to form a borehole in a geologic formation, to transport equipment into and out of a bore in a geologic formation, etc. As an example, a rig may include a system that can be used to drill a bore and to acquire information about a geologic formation, drilling, etc. As an example, a rig configured for drilling can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform. As an example, one or more technologies may be utilized to drill directionally, for example, consider a mud-motor (e.g., a positive displacement motor), a rotary steerable system (RSS), or another type of technology. As an example, a rig or other surface equipment (e.g., onshore or offshore) may be utilized to perform one or more types of operations as part of a workflow that aims to produce fluid from one or more reservoirs.

SUMMARY

A method can include rendering a graphical user interface (GUI) to a display where the GUI includes graphical controls that correspond to windows and objects of a computational framework and a windows builder panel; responsive to receipt of instructions via the graphical controls, generating specifications for the windows and the objects; and storing the specifications for the windows and the objects as a template file. A system can include a processor; memory accessible to the processor; processor-executable instructions stored in the memory and executable by the processor to instruct the system to: render a graphical user interface (GUI) to a display where the GUI includes graphical controls that correspond to windows and objects of a computational framework and a windows builder panel; responsive to receipt of instructions via the graphical controls, generate specifications for the windows and the objects; and store the specifications for the windows and the objects as a template file. One or more computer-readable storage media can include computer-executable instructions executable to instruct a computing system to: render a graphical user interface (GUI) to a display where the GUI includes graphical controls that correspond to windows and objects of a computational framework and a windows builder panel; responsive to receipt of instructions via the graphical controls, generate specifications for the windows and the objects; and store the specifications for the windows and the objects as a template file.

Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
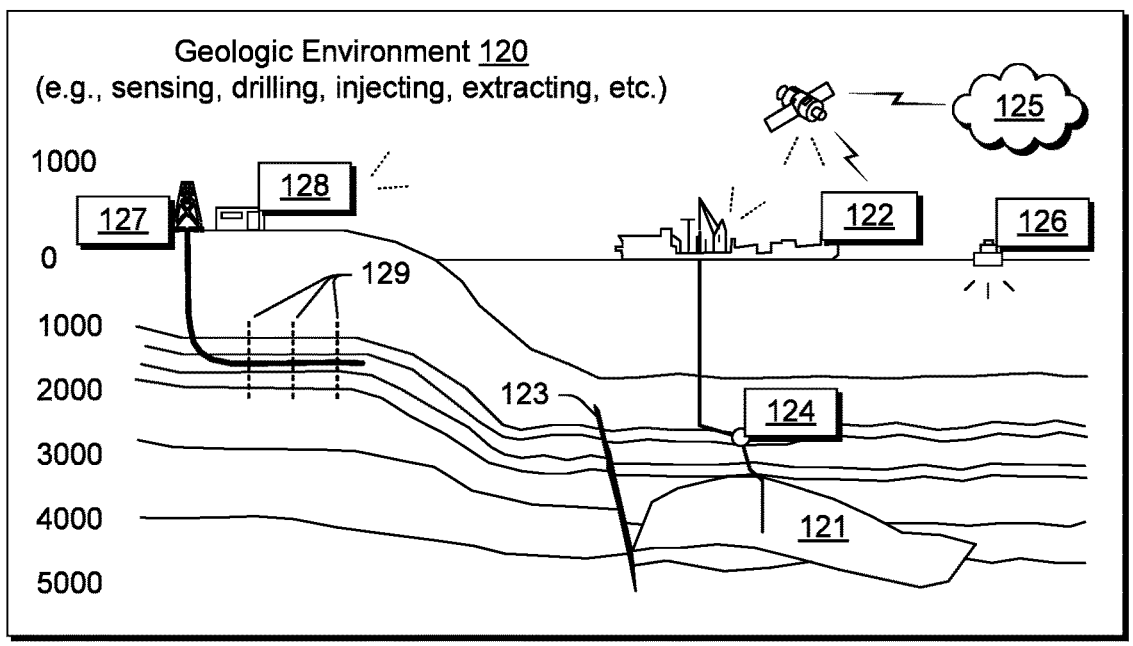
FIG. 1 illustrates examples of equipment in a geologic environment.
Figure 1:
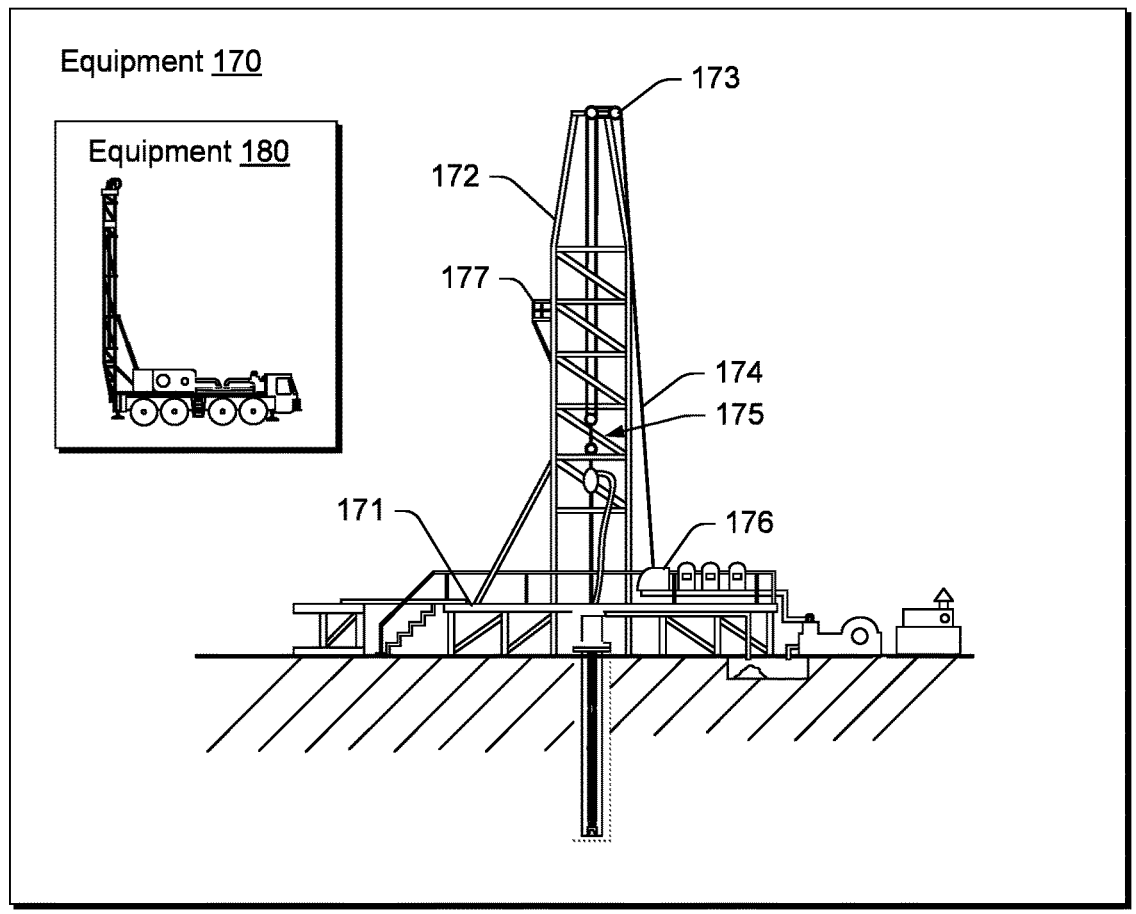

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Various operations can be performed in a field. For example, consider exploration as an initial phase in petroleum operations that includes generation of a prospect or play or both, and drilling of an exploration well or borehole. Appraisal, development and production phases may follow successful exploration.

A borehole may be referred to as a wellbore and can include an openhole portion or an uncased portion and/or may include a cased portion. A borehole may be defined by a bore wall that is composed of a rock that bounds the borehole.

As to a well or borehole, whether for one or more of exploration, sensing, production, injection or other operation(s), it can be planned. Such a process may be referred to generally as well planning, a process by which a path can be mapped in a geologic environment. Such a path may be referred to as a trajectory, which can include coordinates in a three-dimensional coordinate system where a measure along the trajectory may be a measured depth, a total vertical depth or another type of measure. During drilling, wireline investigations, etc., equipment may be moved into and/or out of a well or borehole. Such operations can occur over time and may differ with respect to time. A planning process may call for performing various operations, which may be serial, parallel, serial and parallel, etc.

As an example, a well plan can be generated based at least in part on imposed constraints and known information. As an example, a well plan may be provided to a well owner, approved, and then implemented by a drilling service provider (e.g., a directional driller or "DD"). In such an example, a rig may be used to drill, for example, according to a well plan. During a period of time during which a well plan is implemented, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.).

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.). As an example, the network 125 may be operatively coupled to various resources, which can include computing resources, data storage resources, etc. (e.g., consider cloud-based resources, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
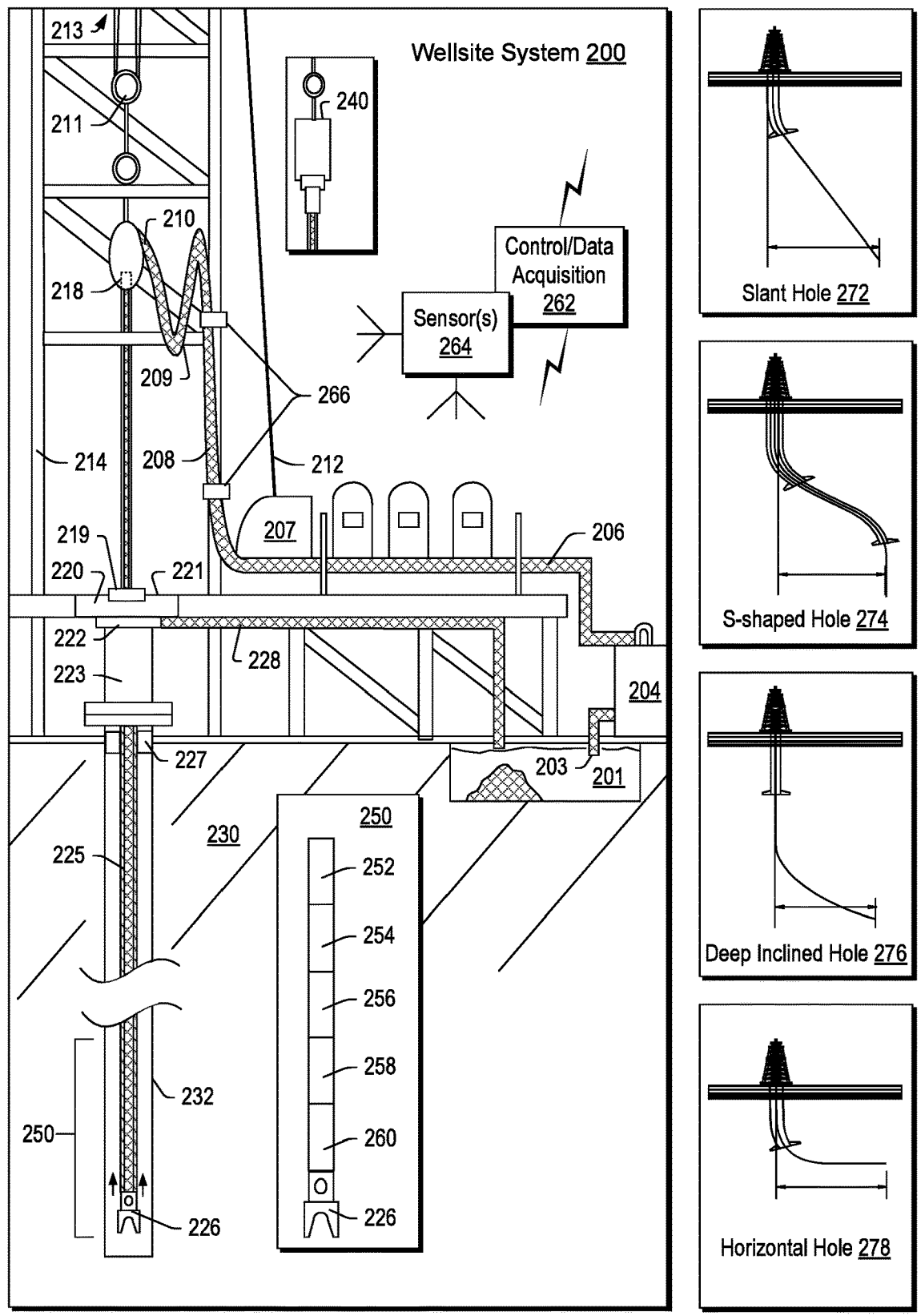
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 215 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for direction drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM can operate in a so-called sliding mode, when the drillstring is not rotated from the surface.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

Figure 3:
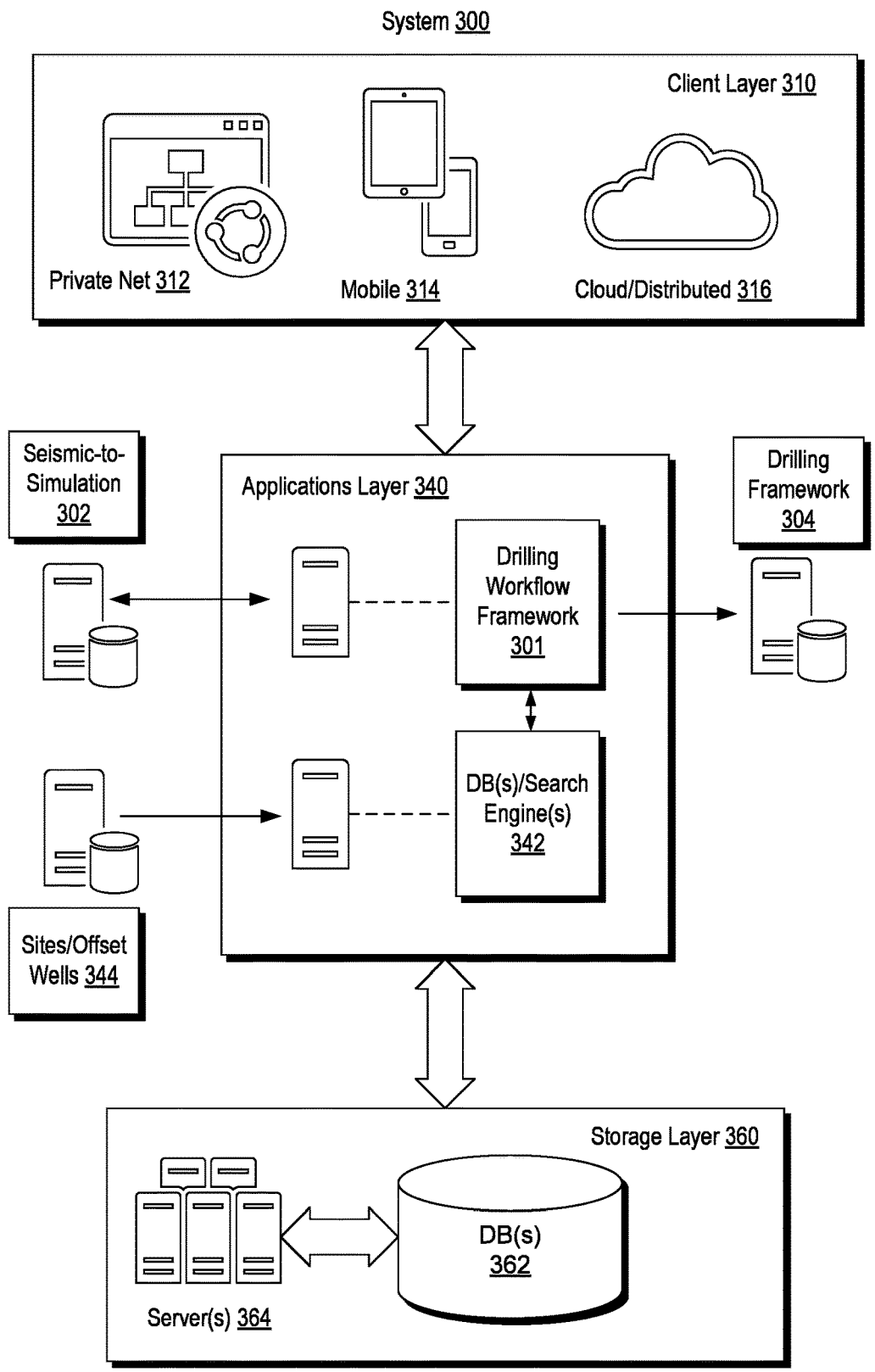
FIG. 3 illustrates an example of a system.

FIG. 3 shows an example of a system 300 that includes a drilling workflow framework 301, a seismic-to-simulation framework 302, a drilling framework 304, a client layer 310, an applications layer 340 and a storage layer 360. As shown the client layer 310 can be in communication with the applications layer 340 and the applications layer 340 can be in communication with the storage layer 360.

The client layer 310 can include features that allow for access and interactions via one or more private networks 312, one or more mobile platforms and/or mobile networks 314 and via the "cloud" 316, which may be considered to include distributed equipment that forms a network such as a network of networks.

In the example of FIG. 3, the applications layer 340 includes the drilling workflow framework 301. The applications layer 340 also includes a database management component 342 that includes one or more search engines features (e.g., executable sets of instructions, etc.).

As an example, the database management component 342 can include one or more search engine features that provide for searching one or more types of information that may be stored in one or more data repositories. As an example, the STUDIO E&P knowledge environment (Schlumberger Ltd., Houston, Tex.) includes STUDIO FIND search functionality, which provides a search engine. The STUDIO FIND search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more components (e.g., executable sets of instructions, etc.) may optionally be implemented within a framework or, for example, in a manner operatively coupled to a framework (e.g., as an add-on, a plug-in, etc.). As an example, a component for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 3, the applications layer 340 can include communicating with one or more resources such as, for example, the seismic-to-simulation framework 302, the drilling framework 304 and/or one or more sites, which may be or include one or more offset wellsites. As an example, the applications layer 340 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 3, the storage layer 360 can include various types of data, information, etc., which may be stored in one or more databases 362. As an example, one or more servers 364 may provide for management, access, etc., to data, information, etc., stored in the one or more databases 462. As an example, the database management component 342 may provide for searching as to data, information, etc., stored in the one or more databases 362.

As an example, the database management component 342 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 300 of FIG. 3 may be implemented to perform one or more portions of one or more workflows associated with the system 200 of FIG. 2. As an example, the drilling workflow framework 301 may interact with a technical data framework and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

As an example, an architecture utilized in a system such as, for example, the system 300 may include features of the AZURE architecture (Microsoft Corporation, Redmond, Wash.). As an example, a cloud portal block can include one or more features of an AZURE portal that can manage, mediate, etc. access to one or more services, data, connections, networks, devices, etc. As an example, the system 300 may include features of the GOOGLE cloud architecture (Google, Mountain View, Calif.).

As an example, the system 300 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 4:
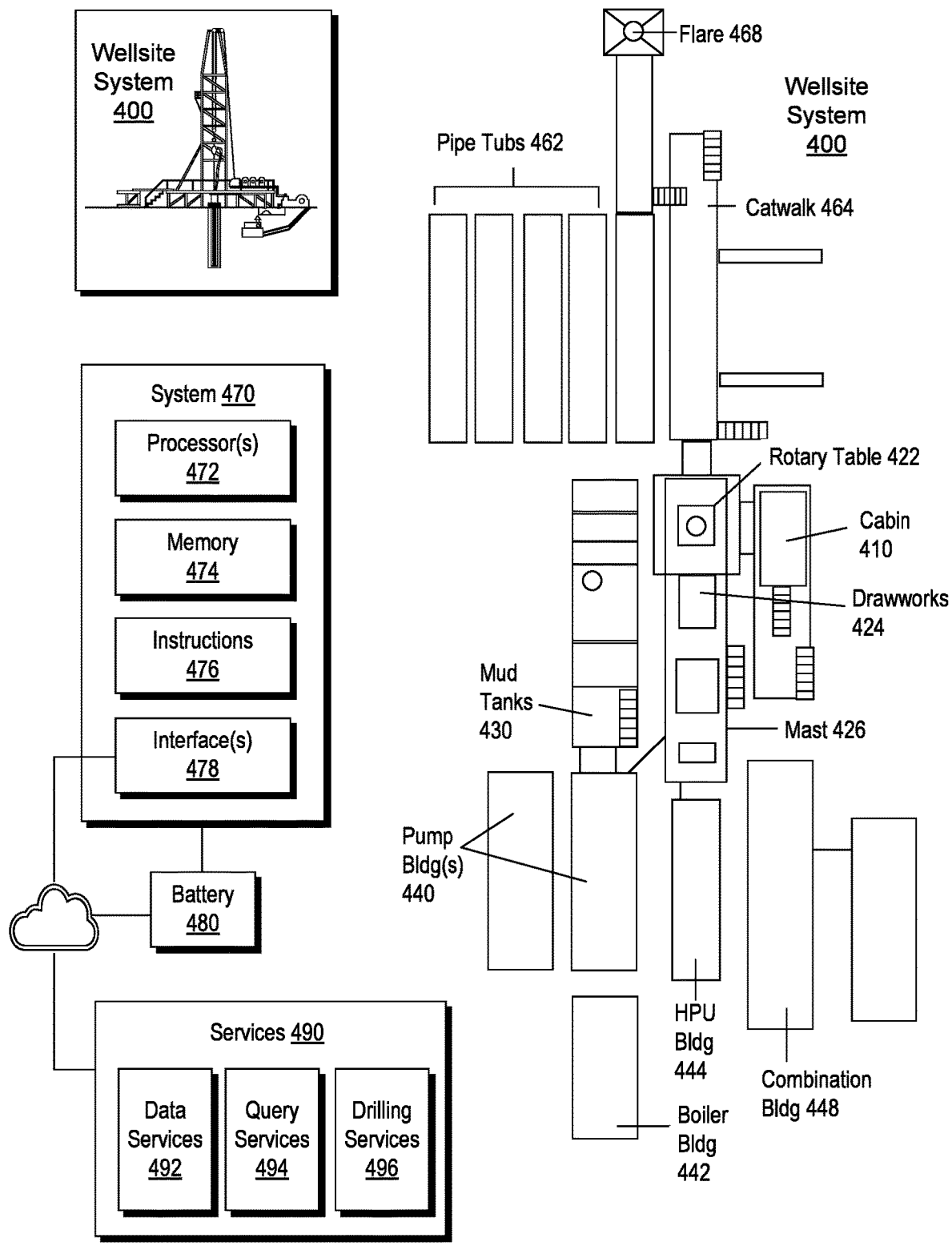
FIG. 4 illustrates an example of a system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, a workflow can commence with an evaluation stage, which may include a geological service provider evaluating a formation. As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory, which may involve execution of one or more G&G software packages. Examples of such software packages include the PETREL framework. As an example, a G&G service provider may determine a well trajectory or a section thereof, based on, for example, one or more model(s) provided by a formation evaluation, and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design. Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory. In some embodiments, a second engineering service provider may perform such design using one of more software applications. Such designs may be stored in one or more databases maintained by one or more servers, which may, for example, employ STUDIO framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like. As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters. As an example, operating parameters, formation encountered, data collected while drilling (e.g., using logging-while-drilling or measurement-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review. As an example, a post review may include reviewing drilling performance. As an example, a post review may further include reporting the drilling performance (e.g., to one or more relevant engineering, geological, or G&G service providers). In various instances, a review can be a quality control process or workflow. As an example, a quality control workflow can involve performing various processes, for example, via one or more frameworks that can provide for rendering of one or more graphical user interfaces (GUIs) with views that can assist a user or users with making quality control assessments.

As an example, consider a quality control workflow that includes determining whether a planned trajectory for a borehole of a well is being followed while drilling the borehole. In such an example, one or more views may be rendered where a user may set various parameters in an effort to facilitate review. In such an example, the views may include data, information, etc., from one or more frameworks, which may be one or more applications that can process one or more types of data, models, simulation results, etc. As an example, a real-time quality control process can include streaming of data from a wellsite (e.g., rigsite) such that views are updated as such data are acquired. In such an example, where directional drilling is utilized, one or more types of parameters may correspond to drilling parameters for associated drilling technology or technologies. For example, where an RSS is utilized, one or more RSS parameters may be visualized via rendering to a display (e.g., rotational speed, direction, toolface angle, etc.) and/or where a PDM is utilized, one or more PDM parameters may be visualized via rendering to a display (e.g., rotary mode, sliding mode, etc.).

Various activities of a workflow may be performed consecutively and/or may be performed out of order (e.g., based partially on information from templates, nearby wells, etc. to fill in gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

Figure 5:
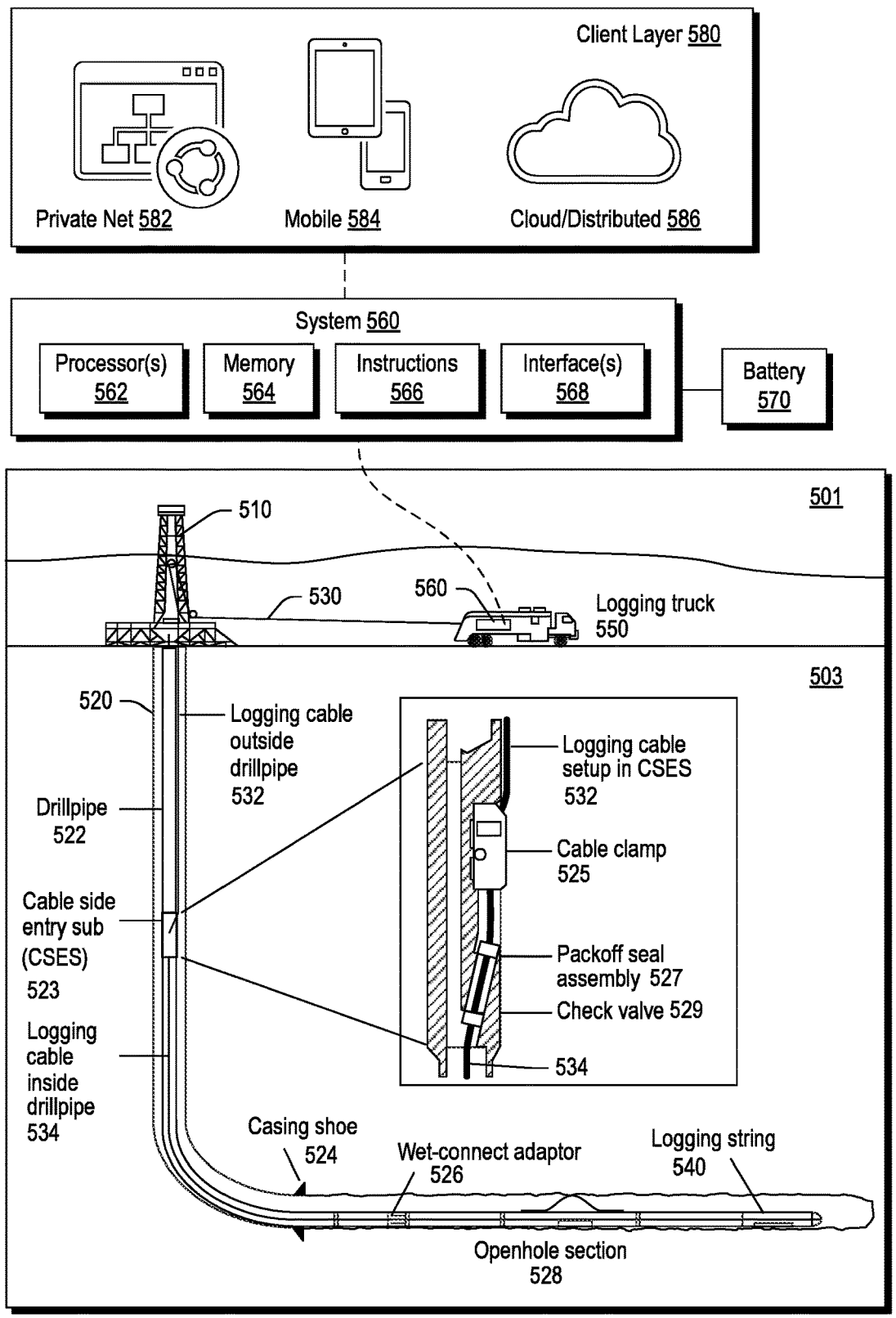
FIG. 5 illustrates an example of a system.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

Figure 6:
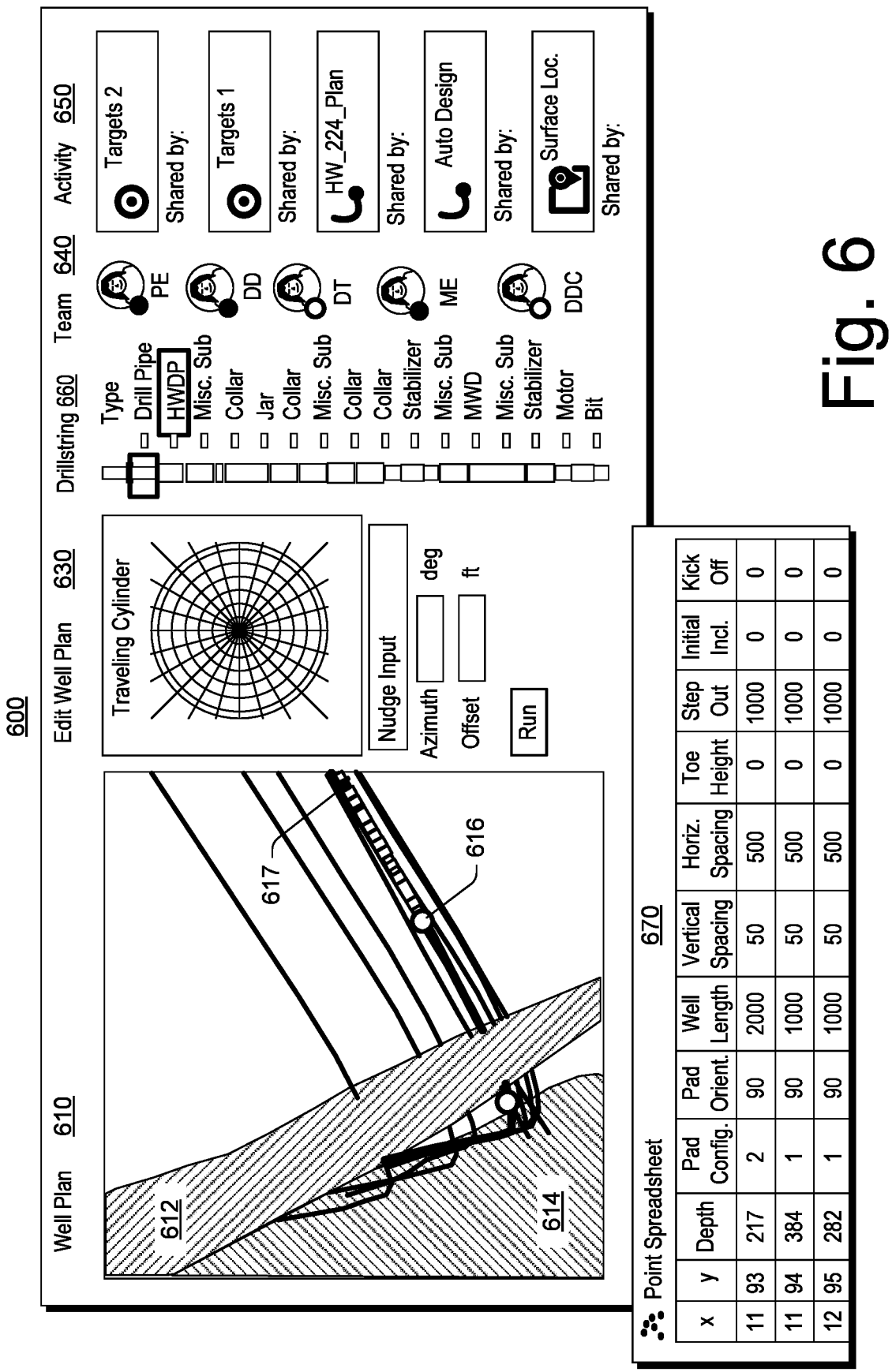
FIG. 6 illustrates an example of a graphical user interface.

FIG. 6 shows an example of a graphical user interface (GUI) 600 that includes information associated with a well plan. Specifically, the GUI 600 includes a window 610 where surfaces representations 612 and 614 are rendered along with well trajectories where a location 616 can represent a position of a drillstring 617 along a well trajectory. The GUI 600 may include one or more editing features such as an edit well plan set of features 630. The GUI 600 may include information as to individuals of a team 640 that are involved, have been involved and/or are to be involved with one or more operations. The GUI 600 may include information as to one or more activities 650. As shown in the example of FIG. 6, the GUI 600 can include a graphical control of a drillstring 660 where, for example, various portions of the drillstring 660 may be selected to expose one or more associated parameters (e.g., type of equipment, equipment specifications, operational history, etc.). FIG. 6 also shows a table 670 as a point spreadsheet that specifies information for a plurality of wells. For example, the point spreadsheet can include coordinates, dimensions, etc., that specify a trajectory of a well, spacing of wells, etc.

Figure 7:
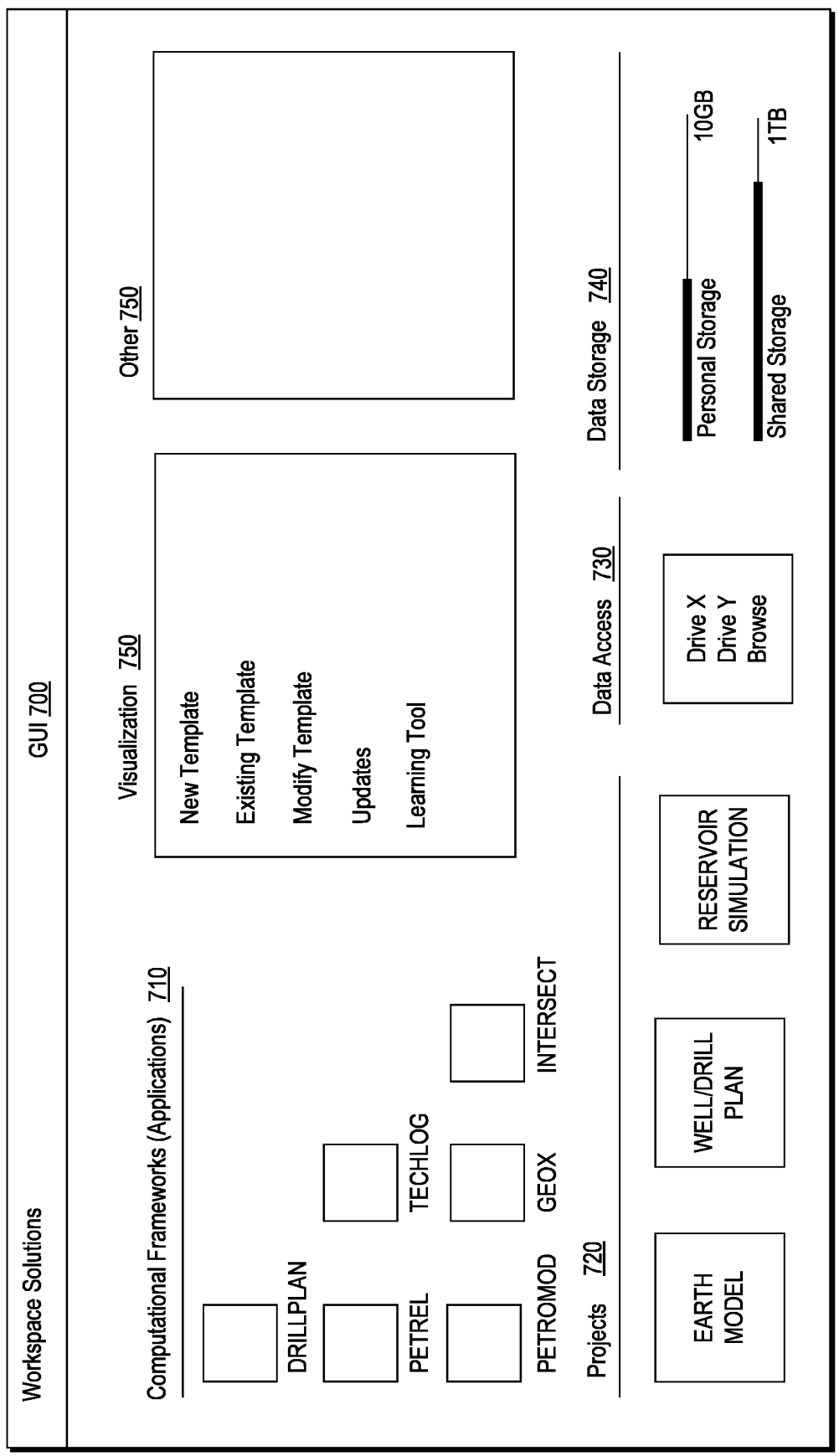
FIG. 7 illustrates an example of a graphical user interface.

FIG. 7 shows an example of a GUI 700 that includes various features that can be part of a workspace. For example, a computational framework area 710 includes icons that represent various types of computational frameworks such as a drilling plan framework, a seismic-to-simulation framework (e.g., PETREL framework, Schlumberger Limited, Houston, Tex.), a measurements framework (e.g., TECHLOG framework, Schlumberger Limited, Houston, Tex.), a mechanical earth modeling (MEM) framework (PETROMOD framework, Schlumberger Limited, Houston, Tex.), an exploration risk, resource, and value assessment framework (e.g., GEOX, Schlumberger Limited, Houston, Tex.), and a reservoir simulation framework (INTERSECT, Schlumberger Limited, Houston, Tex.). As an example, one or more computational frameworks may be suitable for use in a system such as the system 300 of FIG. 3, the wellsite system 400 of FIG. 4, the system 500 of FIG. 5, etc. The GUI 700 can include a projects area 720 for various types of projects, a data access area 730 for accessing data, a data storage area 740 for rendering graphics associated with data storage, a visualization area 750 for controlling rendering of graphics, data, text, etc., as associated with one or more projects, and another area 760 for one or more other types of features as may be associated with one or more projects and/or one or more sets of data.

As an example, a framework may be implemented within or in a manner operatively coupled to the DELFI cognitive exploration and production (E&P) environment (Schlumberger, Houston, Tex.), which is a secure, cognitive, cloud-based collaborative environment that integrates data and workflows with digital technologies, such as artificial intelligence and machine learning. As an example, such an environment can provide for operations that involve one or more frameworks, for example, one or more frameworks may be interoperative and/or run upon one or another. As an example, a framework environment such as the OCEAN framework environment (Schlumberger, Houston, Tex.) may be utilized, which allows for integration of add-ons (or plug-ins) into a PETREL framework workflow. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a components layer. In a framework environment (e.g., OCEAN, DELFI, etc.), a model simulation layer can include or operatively link to a model-centric framework. In an example embodiment, a framework may be considered to be a data-driven application. For example, the PETREL framework can include features for model building and visualization. As an example, a model may include one or more grids where a grid can be a spatial grid that conforms to spatial locations per acquired data (e.g., satellite data, logging data, seismic data, etc.).

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA framework, marketed by Schlumberger, Houston, Tex.) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL framework, etc.).

Seismic data can be acquired as traces and stored, for example, as individual traces in a seismic cube (e.g., volumetric data, data array, etc.). In seismic data acquisition, one or more sources can emit energy and one or more receivers can receive energy where energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second). Traces can include amplitude values where the amplitude values can be rendered to a display as a seismic image, can be processed using seismic attribute algorithms, etc. A seismic image can include indicia of reflectors that are subsurface structures that may indicate a presence of hydrocarbons in a subsurface region of the Earth, which may be a reservoir. As explained, drilling may be performed as part of a well plan to construct a well that targets the reservoir such that hydrocarbon fluid(s) can flow from the reservoir into the well and to surface (e.g., for processing via surface equipment, etc.). As an example, a quality control process, workflow, etc., can be implemented that utilizes seismic data, which may be utilized for renderings to a display, for example, to assess interpretations, models, simulations, trajectories, logs, fracturing, etc.

As to interpretations, a workflow can involve picking such as horizon picking, salt body picking, fault picking, etc. As an example, seismic data can include indicia of events. An event can be an appearance of seismic data as a diffraction, reflection, refraction or other similar feature produced by an arrival of seismic energy. As an example, an event can be a single wiggle within a trace, or a consistent lining up of several wiggles over several traces. An event in a seismic section can represent a geologic interface, such as a fault, unconformity or change in lithology. As an example, an interpretation process can include picking one or more events where an event identifier may be associated with each event (e.g., an event ID, etc.).

As to fracturing, seismic data can include microseismic data, which are generated by fracturing rock in a subsurface region. Analysis of microseismic data can provide insights as to fracture formation, which may guide one or more fracturing processes. As an example, a quality control process, workflow, etc., can include assessing a fracturing plan (e.g., as may be developed using a fracturing simulation framework) and actual fractures (e.g., using microseismic data, etc.). As an example, a fracturing simulation framework may include one or more features of the MANGROVE framework (Schlumberger Limited, Houston, Tex.), which can provide for integrating microseismic data and discrete fracture networks (DFNs) in unconventional fracture modeling, which can allow for one or more processes for an operator to understand and characterize fracture geometry (e.g., number, length, direction, aperture, etc.), drainage area, production, quality of fractures, etc.

In the example of FIG. 7, the GUI 700 may expose one or more resources. As an example, a remote resource may be managed using a cloud platform. For example, consider a GOOGLE cloud platform (Google LLC, Mountain View, Calif.), an AMAZON WEB SERVICES (AWS) cloud platform (Amazon, Seattle, Wash.), a MICROSOFT AZURE cloud platform (Microsoft Corporation, Redmond, Wash.), etc.

As an example, a cloud platform may provide for object storage, block storage, file storage (e.g., a shared filesystem), managed SQL databases, NoSQL databases, etc. As to types of data, consider one or more of text, images, pictures, videos, audio, objects, blobs, structured data, unstructured data, low latency data, high-throughput data, time series data, semistructured application data, hierarchical data, durable key-value data, etc. For example, particular data may be utilized in visual renderings and demand low latency such that glitches do not occur during buffering, rendering, interactive manipulations, etc. As an example, particular data may be generated as a binary large object (blob) for purposes of transmission, security, storage organization, etc. As an example, a sensor may generate time series data, which may be regular and/or irregular in time and which may or may not include a "global" time marker (e.g., time stamps, etc.). As an example, data may be in a WITSML standard, which is a standard utilized in various operations including rig operations. As an example, data may be serially transferred ASCII data.

In the example of FIG. 7, one or more of the computational frameworks may be local and/or one or more of the computational frameworks may be remote. For example, the GUI 700 may be rendered locally using a display operatively coupled to a workstation (e.g., laptop, desktop, etc.) where the workstation includes executable instructions for instantiating a computational framework and/or the GUI 700 may be rendered locally using a display operatively coupled to or part of a computing device that includes one or more network interfaces that can operatively couple to one or more remote resources that can instantiate a computational framework.

As explained, some features may be local and some features may be remote and various features may be within a common platform such as a cloud platform.

In the example of FIG. 7, the GUI 700 includes the visualization area 750, which lists some examples of features that may be available. For example, consider a new template feature that can be actuated to commence a process for generating a new template for visualizations as may be applied to one or more of the applications of the computational frameworks 710. As an example, a template can specify how rendering is to occur by one or more of such computational frameworks. In such an example, the template can specify parameters, parameter values, etc., that can harmonize how items, objects, etc., are rendered to a display. For example, consider a horizon as an object that may be available in the PETREL and TECHLOG computational frameworks. A template may specify that the horizon is to be rendered using a particular color such that a window with renderings of the PETREL computational framework that include the horizon utilize the same color for the horizon as in a window with renderings of the TECHLOG computational framework that include the horizon. In such an approach, a user may readily identify the horizon in multiple windows of different computational frameworks through use of a common color as specified by a multi-computational framework template. While color is mentioned as an example, a template can include other specifications such as, for example, consider one or more of window arrangement, window size, text style, text size, language, graphical control style, keystroke commands, etc.

As shown, a graphical control can allow for selection of an existing template. For example, a user may have a desired rendering scheme that is specified by a template customized by that user or otherwise available. The user may select the graphical control for "Existing Template" to cause a window to be rendered for browsing or presenting a list (e.g., or icons, etc.) for selection of the desired, existing template. Once selected, the workspace can control how various computational frameworks perform rendering to a display or displays.

As shown, a graphical control can allow for modifications to a template, which may be performed during visualization of information, data, etc. For example, where a new feature represented as a new object appears in a rendering, a user may actuate the "Modify Template" graphical control to provide input as to how the new object is to be rendered, for example, to harmonize with a scheme of a template that is currently being used. In such an example, the user may modify that template. While the workspace GUI 700 shows the visualization area 750 as including such a graphical control, as an example, a window may include a graphical control for such a template modification. For example, consider a salt body being rendered as a new object where a user can right click on the salt body to assign a color to the salt body. In such an example, the underlying, currently utilized template may be modified upon the user's assignment of the color. In such an example, if the salt body is being at least in part rendered in another window by another, different computational framework, that window can be updated per the modification to the template. For example, after the user assigns the new color, the modified template may call for a refresh action by the computational frameworks such that the rendered windows are refreshed to correspond to specifications of the modified template.

As shown in the example of FIG. 7, the visualization area 750 can include an update or updates graphical control. Such a graphical control can be actuated manually and/or execute in a background mode, which may be an automatic mode. For example, where a revision occurs to one of the computational frameworks, a template update component can become informed of the revision, which may include, for example, introduction of one or more new types of objects, windows, controls, etc. In response, a template may be automatically assigned default specifications for the new features. Upon use of the template, the workspace GUI 700 or another GUI may render a notice to a display that informs a user of the new features and, for example, the default specifications, which may be subjected to modification.

As an example, the visualization area 750 can include a learning tool that can be actuated for a specified rendered GUI or, for example, a screen-shot capture of a GUI of a computational framework. For example, a learning tool may be an image recognition tool that is trained (e.g., as a trained machine learning model, which may be a trained neural network model, etc.) to identify graphical controls and other features that can be in a GUI. Such an approach can optionally link to a computational framework for further investigation, for example, to link an identified graphic with an object and to explore options for controlling how that object is rendered, if possible. For example, consider a GUI of a computational framework that includes a graphic that is not grouped and exposed in a manner akin to other graphics. A learning tool may identify that graphic, notify a user of its existence and notify a user that it is not grouped with other graphics and therefore may demand a different template entry to control how that graphic is presented.

As an example, a visualization component can be operable with one or more application programming interfaces (APIs). For example, consider computational frameworks that include APIs for objects, etc., which can be rendered to a display. The visualization component may issue API calls that can retrieve those objects, etc., such that a template can include specifications therefor. As an example, additionally or alternatively, a visualization component can include an API that is callable by a computational framework. In such an example, a computational framework may issue a call to the visualization component via the API to return a listing of items that are in a template of the visualization component. Where the listing of items (e.g., objects, etc.) does not match, the computational framework may issue a notice to indicate that a template may be over- or under-inclusive. In response, a template may be updated to provide an adequate match.

Figure 8:
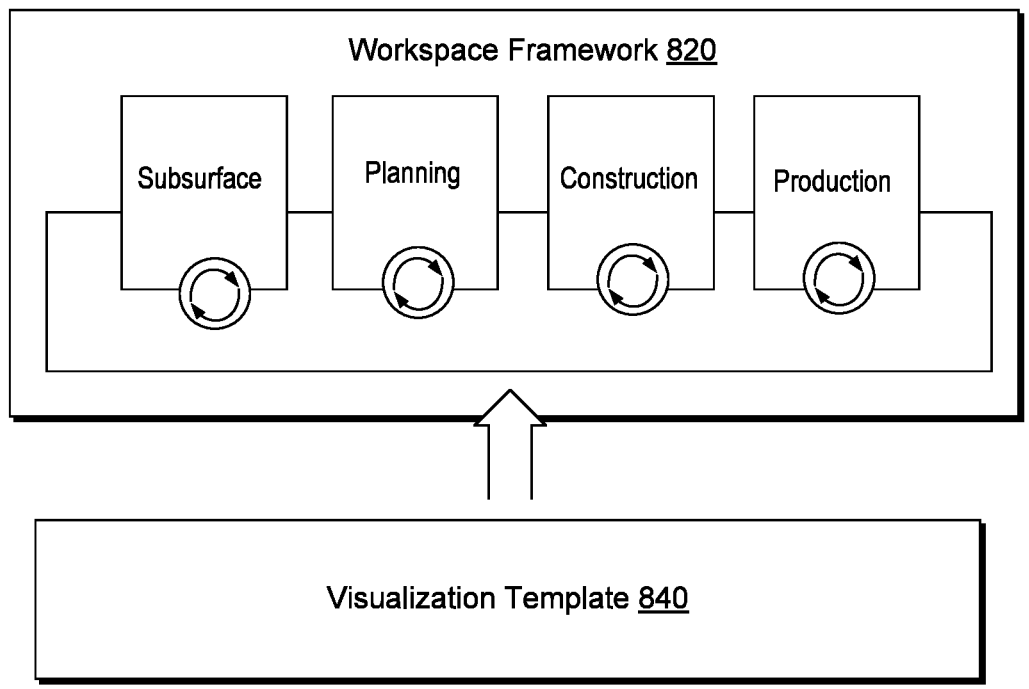
FIG. 8 illustrates an example of a system.

FIG. 8 shows an example of a system 800 that includes a workspace framework 820 that is operatively coupled to various computational frameworks such as computational frameworks for subsurface modeling, well planning, well construction and resource production. As shown in the example of FIG. 8, the workspace framework 820 can be operable according to one of more visualization templates 840, which may, for example, be defined, constructed, modified, generated, etc., as described with respect to the visualization area 750 of the GUI 700 of FIG. 7. As an example, a template may be available locally and/or remotely (e.g., in a cloud environment, etc.).

As an example, a user may utilize the GUI 700 of FIG. 7 to cause the system 800 of FIG. 8 to perform one or more template related operations, which can include loading, generating, modifying, discovering, rendering, etc.

As an example, the workspace framework 800 may access data from one or more sources. For example, consider the PROSOURCE E&P data management system (Schlumberger Limited, Houston, Tex.), which provides management, visualization, and delivery capabilities for various types of data to streamline various workflows. Such a system can provide real-time capabilities to proactively manage wellbore operations using vendor-neutral data aggregation features. As an example, an aggregator system can be an operations equipment ready system that can be integrated into a system for a desired location with data connectivity (e.g., rig equipment installation, logging equipment installation, seismic equipment installation, laboratory equipment installation, etc.). As an example, a real-time data system can collect multiple data types, which may include customized data types according to customized data formats and/or one or more of the following data formats: WITS (e.g., serial, file, TCP, and http); WITSML (1.1, 1.2, 1.3.1.1 client and server); OPC-DA and OPC-UA (clients); DLIS; MAX-WELL; and CSV. As to a semantic understanding of what data actually represents, consider data that represents a wellbore as an entity, which may be an object in an Earth model of a computational framework.

In many geophysical workflows, a user (e.g., a geophysicist, etc.) can be working on a project where the user inspects rendered information (e.g., data, results, etc.) to determine quality, which may include making one or more of a "sanity" check, a consistency check, etc. For example, a user may inspect a map with rendered locations to determine that the locations are proper (e.g., North Sea rather than Western Africa). As another example, a user may view a 3D rendering of a salt body in one window and a seismic cross-section of the salt body in another window to determine if the salt body is the same in both windows (e.g., if the object rendered in the 3D window corresponds to indicia in the 2D window). As yet another example, a type of well completion may appear in one or more renderings of multiple wells where the user wants to check that each of those wells includes that particular type of completion. In such an example, one rendering may be of a bottom hole assembly (BHA) and another rendering may be of a borehole trajectory with a graphical representation of the actual location of the BHA. In the various foregoing examples, which can include rendering of multiple computational frameworks, the user's quality control efforts can be improved by consistent rendering of particular objects. As explained, a template can be a multi-computational framework template that can specify how items are to be rendered consistently across two or more of computational frameworks.

As an example, consider a quality control process where a user opens different visualization windows, such as maps, 2D, 3D, etc. and loads data into these windows to analyze to determine if the data are good and to create derivative interpretation data therefrom or based thereon. In such an example, the user can be taught to follow pre-defined procedures to quality control (QC) the data from project to project; however, without an overarching template, the user may have to repeatedly configure individual windows and/or datasets to view from project to project, which can result in an abundant number of mouse clicks. Further, the user may run into an issue where alteration of a rendering is not readily controllable, for example, the user may have to access a computational framework outside of a workspace such as the workspace GUI 700 to be able to make the desired alteration. Such an approach can be tedious and result in non-productive time, as well as additional mouse clicks (e.g., for navigation, etc.). Such an approach can be counter-productive to the benefits of using a common workspace GUI such as the GUI 700 of FIG. 7.

As an example, a workspace framework can include a quality control (QC) builder tool (e.g., a builder tool component, a builder tool application, a builder tool framework, etc.) that can provide for harmonization across multiple computational frameworks. For example, consider a subsurface QC builder tool that allows a geophysicist to create a QC layout template one time by defining the window types (e.g., panel types, etc.) and layout, and the object types that are to be displayed within each window by using a tag. In such an example, the geophysicist can set or pre-configure the visual display settings of the objects to be displayed in the windows based on their preference and/or a client's preferences (e.g., consider preferences as to coloring, sizing, pattern, etc.). In such an example, when the geophysicist is ready to QC data, the geophysicist can simply open one of the QC layout templates in their software application and begin inspecting the data without having to waste time setting the windows, objects to display, and visualization style settings over and over again.

While the foregoing example mentions "subsurface", examples can pertain to surface, subsurface or other types of renderings. For example, consider a surface distribution network for fluids (e.g., liquids, gases, etc.). Such a network may be modeled in a computational framework such as the PIPESIM framework (Schlumberger Limited, Houston, Tex.). In such an example, compositions of fluids may be rendered using colors, for example, consider oil being in green and water being in blue. A reservoir simulator can generate results as to composition in a subsurface environment where the results may be rendered using color. In such an example, a template may specify that results of the reservoir simulator are rendered with oil in green and water in blue such that the subsurface results are harmonized with fluids in the surface distribution network. Such an approach can provide for QC, for example, to assure that oil in green flowing from a well in fluid communication with the reservoir is indeed providing oil in green to the surface distribution network at the wellhead and thereon (e.g., to a processing facility). As an example, a mixture of oil and water may be represented in mixtures of green and blue (e.g., blue green being more water than oil and green blue being more oil than water). Where gas is utilized, such as in artificial lift, gas may be represented in yet another color. As may be appreciated, a template-based approach can provide for QC between surface and subsurface items (e.g., components, features, fluids, etc.).

As an example, a builder feature can allow a user to create a QC window layout template. For example, via such a tool, a user can configure which window types, object types, and tools/controls can be used for a QC workflow. The builder feature can allow the user to save the QC window layout template for later use/reuse.

As an example, when a user is ready to inspect data related to a geophysical workflow, the use can open one or more computational frameworks (e.g., an application or applications) to perform QC and load the QC window layout template into the application or applications. As an example, a template can be modified using a template tool, for example, where a user may desire to resolve which objects are to go into which windows (e.g., in case of ambiguity between an object tag and an object in an application). As an example, once a QC window layout template is loaded into an application or applications, a user may begin inspecting the data, creating derivative interpretations, etc. As an example, a derivative interpretation can be based on one or more actions, which may include one or more of a simulation run, an interpretation of seismic data as to one or more structural features, an adjustment to a borehole trajectory for a well being drilled or to be drilled, etc.

As explained, performing QCs can involve many clicks and without the ability to save a template for a QC, the work can demand repetition. Where performing a QC involves utilization of multiple computational frameworks, a user may have to set parameters, parameter values, etc., for each of the individual computational frameworks.

As an example, a template tool can generate a QC window layout template that can be loaded into a QC application so the user does not have to reconfigure the QC application upon each use of the QC application, as may be involved in one or more different project contexts.

As an example, a template can be a reusable template that can be utilized for multiple web applications (e.g., web browser types of applications, applications that can consume instructions in one or more web browser types of formats, etc.). For example, a template may involve use of the JAVASCRIPT object notation format (JSON) and/or one or more other languages/formats. As an example, a template may be sharable, for example, to allow for collaboration amongst user that may perform one or more task, which may include one or more QC tasks. For example, consider a dialog between two users as to the quality of data where one user may want the opinion of the other. Where items are rendered according to a common scheme for both users, the dialog can be facilitated as both may see an item in a common color (e.g., a horizon being rendered in orange, etc.).

As an example, a system can include a template database, which can include templates that include pre-defined parameters, parameter values, etc. As an example, templates may be grouped according to teams, clients, etc. In such an approach, a user may be able to identify a team's work by the manner in which items are rendered. As an example, where a common data set is to be analyzed by multiple teams, each may select its own template, which may facilitate communication between team members. As mentioned, a template may be modified, for example, to possibly resolve one or more object type to object data assignments. As an example, a template-based approach to performing QC tasks can provide a more efficient user experience. For example, a template-based approach can facilitate a workflow where a user is to perform QC related activities to validate that data are of acceptable quality.

As an example, a template framework can include a front-end application that allows a user to build a QC layout (e.g., a builder tool framework). In such an example, a user can configure various aspects of visualizations such as, for example, where a map, a 2D window, a 3D window, etc., will be placed on a screen along with, for example, their relative sizes. Additionally, a template framework can provide a mechanism to choose the rendering objects expected for each window in a QC layout. As an example, output of a front-end application can be a QC layout that can be used when there is integration of various visualization windows. As an example, output of a front-end application may be in one or more forms such as, for example, a JSON template file or an HTML template file.

As to the JAVASCRIPT object notation (JSON) format, JSON includes data types such as the following:

Number: a signed decimal number that may contain a fractional part and may use exponential E notation.

String: a sequence of zero or more Unicode characters. Strings are delimited with double-quotation marks and support a backslash escaping syntax.

Boolean: either of the values true or false.

Array: an ordered list of zero or more values, each of which may be of a particular type. Arrays use square bracket notation and elements are comma-separated.

Object: an unordered collection of name—value pairs where the names (also called keys) are strings. Since objects are intended to represent associative arrays. Objects are delimited with curly brackets and use commas to separate each pair, while within each pair the colon ':' character separates the key or name from its value.

null: An empty value, using the word null.

As an example, a person may be represented as follows in the JSON format:

```
{
    "firstName": "John",
    "lastName": "Smith",
    "isAlive": true,
    "age": 27,
    "address": {
        "streetAddress": "21 2nd Street",
        "city": "New York",
        "state": "NY",
        "postalCode": "10021-3100"
    },
    "phoneNumbers": [
        {
            "type": "home",
            "number": "212 555-1234"
        }
    ]
}
```

As an example, colors may be specified as follows in the JSON format:

```
{
    "template_name": "QC_3",
        "Horizon_Colors": ["#C00000", "#ffc000", "#B0C6D7", "#75BDA7"] ,
        "Background_Color":"#FFFFFF",
        "Text_Color": "#FF0000",
        * * *
}
```

As an example, window parameters may be specified as follows in the JSON format:

```
{
    "window": {
        "toolbar": true,
        "width": 800,
        "height": 1200,
        "position": "100, 100", (e.g., or "position": "mouse")
        "resizable": false
    }
}
```

As an example, font color may be set in HTML using a statement such as: <font color="red">.

As an example, a window can be a PYTHON language type of panel. In the PYTHON language, various commands are available as to panels (e.g., panels as objects) such as, for example:

Panel.above( ): Returns the panel above the current panel.
Panel.below( ): Returns the panel below the current panel.
Panel.bottom( ): Push the panel to the bottom of the stack.
Panel.hidden( ): Returns true if the panel is hidden (not visible), false otherwise.
Panel.hide( ): Hide the panel. This does not delete the object, it just makes the window on screen invisible.
Panel.move(y, x): Move the panel to the screen coordinates (y, x).
Panel.replace(win): Change the window associated with the panel to the window win.
Panel.set_userptr(obj): Set the panel's user pointer to obj. This is used to associate an arbitrary piece of data with the panel, and can be a PYTHON object.
Panel.show( ): Display the panel (which might have been hidden).
Panel.top( ): Push panel to the top of the stack.

Panel.userptr( ): Returns the user pointer for the panel. This might be a PYTHON object.

Panel.window( ): Returns the window object associated with the panel.

While the PYTHON language is mentioned, such types of methods may be available in one or more other languages such that, for example, a template that includes settings may utilized one or more of such methods to handle rendering of windows, which may be panels.

As an example, a framework may include one or more converters. For example, consider a JSON to PYTHON converter and/or a PYTHON to JSON converter. Examples of code using PYTHON language features are shown below:

```
import json
# some JSON:
x = '{"name":"John", "age":30, "city":"New York"}'
# parse x:
y = json.loads(x)
# the result is a PYTHON dictionary:
print(y["age"])
import json
# a PYTHON object (dict):
x = {
  "name": "John",
  "age": 30,
  "city": "New York"
}
# convert into JSON:
y = json.dumps(x)
# the result is a JSON string:
print(y)
```

Figure 9:
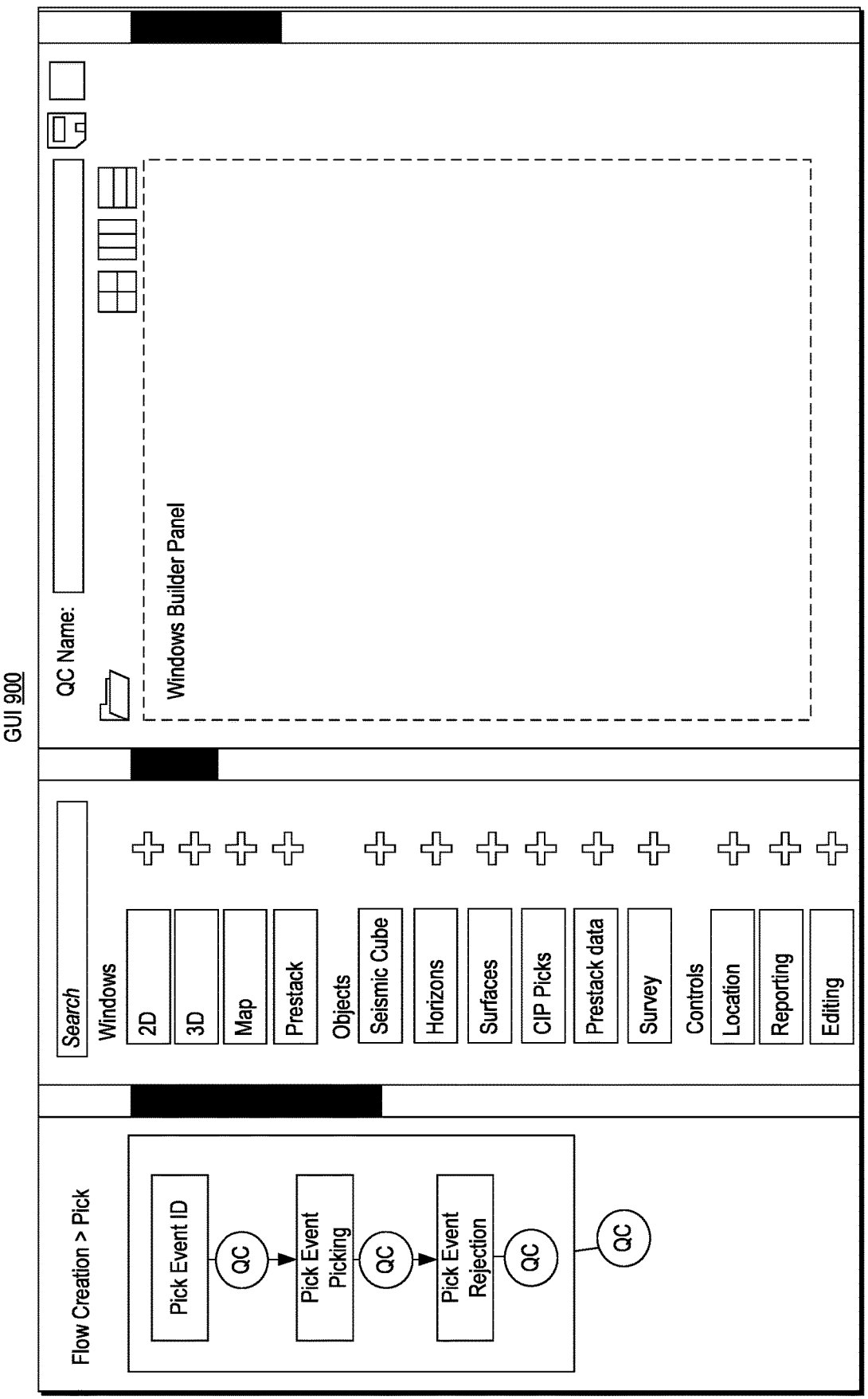
FIG. 9 illustrates an example of a graphical user interface.

FIG. 9 shows an example of a GUI 900 of a framework that includes a workflow that pertains to quality control (QC), which may be created using the framework (see, e.g., "Flow Creation"). The GUI 900 also includes features for building a template, which can include features for selection of windows (e.g., 2D, 3D, map, prestack, etc.), objects (e.g., seismic cube, horizons, surfaces, CIP picks, prestack data, survey, etc.) and controls (e.g., location, reporting, editing, etc.). In the example of FIG. 9, the GUI 900 includes a search feature that can be utilized to search for an item, which may be, for example, a window, an object, a control, etc. The GUI 900 includes a space that can be utilized to create a layout. As an example, the GUI 900 can include a field where a user can enter a name such that a template with that name can be generated. As an example, the template may include information pertaining to the workflow as illustrated in the GUI 900. A "save" or "store" icon is shown in the GUI 900 that can be utilized to store a template to a storage device.

In the example of FIG. 9, the GUI 900 shows a flow creation for a workflow that includes a Pick Event ID, QC, Pick Event Picking, QC, Pick Event Rejection, QC, and a final QC. As mentioned, an event can be a seismic event where picking can be part of an interpretation process. As an example, a QC process can involve assessing one or more interpretations of seismic data, which can involve QC of picked events (e.g., structural features in a subsurface environment, etc.).

As an example, a template with specifications can include workflow related specification such that, for example, renderings to a display are operatively coupled to a workflow. For example, a workflow can include a first action that corresponds to rendering of several windows according to a template. The first action may be completed and a user may close one or more of the windows, which may cause, for example, rendering of one or more windows of a second action of the workflow, which may be per the template or per another template as associated with one or more of various actions of the workflow. In such an example, a graphical control may be rendered to a display that asks if a user is ready or desires to proceed to another action of a workflow such that rendering for that action can be performed. Alternatively, such rendering may occur automatically, for example, in response to one or more action being completed (e.g., a window being closed, a particular signal from a computational framework, etc.). In such an approach, a template or templates (e.g., as build using a builder framework or tool) can facilitate use of one or more computational frameworks to perform a workflow.

Figure 10:
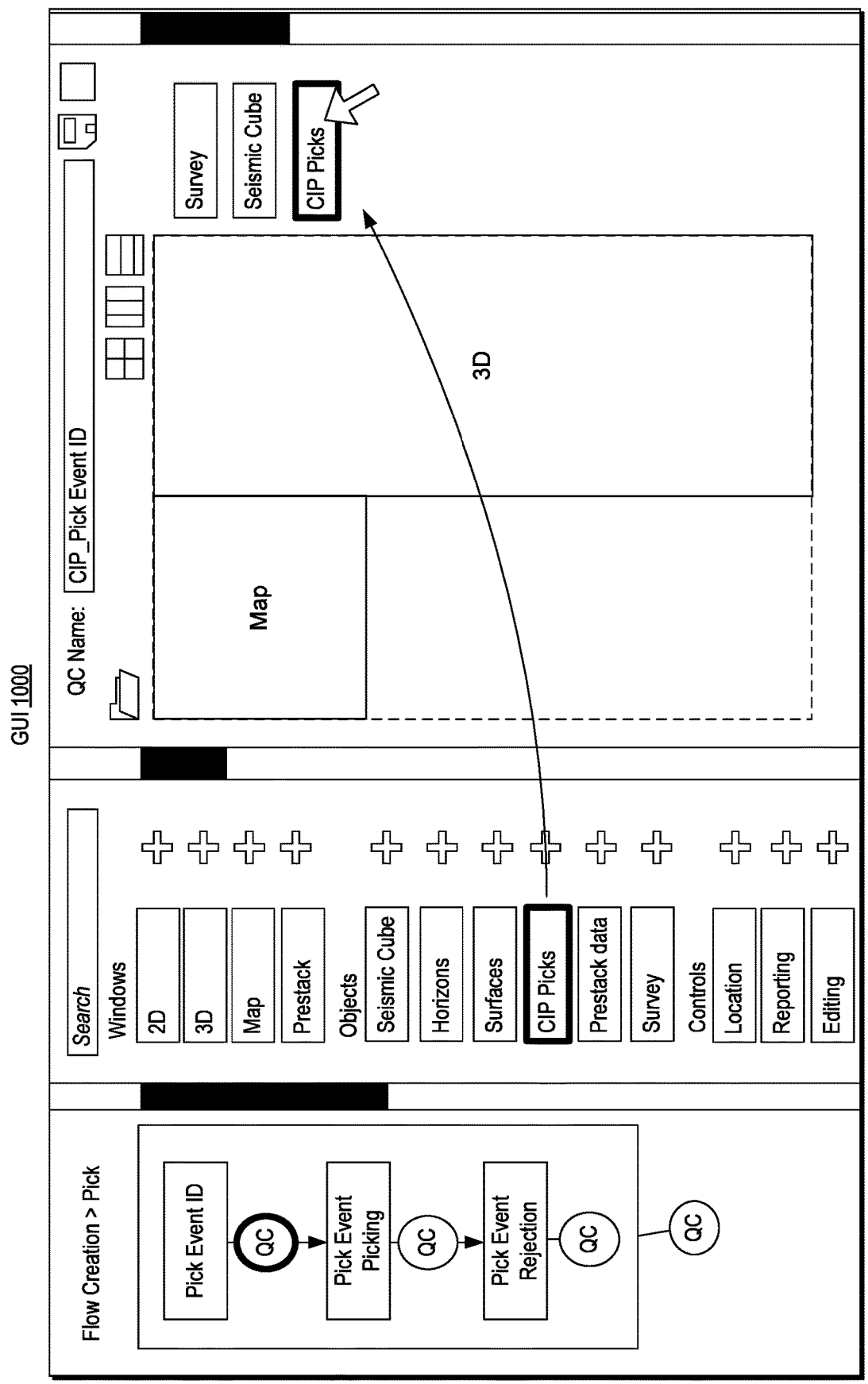
FIG. 10 illustrates an example of a graphical user interface.

FIG. 10 shows an example of a GUI 1000 of a framework, which can be a subsequent rendering of the GUI 900. For example, as the workflow involves a block entitled "Pick Event ID", a layout can be generated by using the CIP Picks feature, for example, by dragging and dropping the CIP Picks feature (e.g., graphic) onto the builder panel (e.g., layout panel). A builder panel can be an area in a GUI that can include one or more windows. Such a builder panel can be referred to as a windows builder panel, as it can include one or more windows that can be arranged, for example, with respect to one another. For example, consider a window arranged above or below another window, to the left or right of another window, with a size according to a ratio references with respect to another window, etc.

As mentioned, in the PYTHON language, panels are windows with the added feature of depth, so they can be stacked on top of each other, where, in a stack, visible portions of each window will be displayed. Panels can be added, moved up or down in the stack, and removed. As an example, a window can be a panel (e.g., as in the PYTHON language and/or another language). And, for example, a builder panel may optionally specify how one or more windows (e.g., panels) are stacked, if stacked (e.g., consider a stacking order). As an example, a stacking order of windows (e.g., panels) may be an initial order that is amenable to adjusting during a workflow where a user may wish to alter the order of windows (e.g., panels) rendered where the windows (e.g., panels) are rendered according to specifications set through use of a builder panel of a template building tool, etc.

As shown, the builder panel already includes a map window and 3D window, which are arranged with respect to each other, which may be for purposes of facilitating the workflow. Further, as shown, "Survey" and "Seismic Cube" have already been included in the builder panel. In such a manner, a user can build a layout for a particular QC-related workflow. As shown, the example workflow includes multiple QC tasks with intervening blocks (e.g., "Pick Event Picking" and "Pick Event Rejection").

Figure 11:
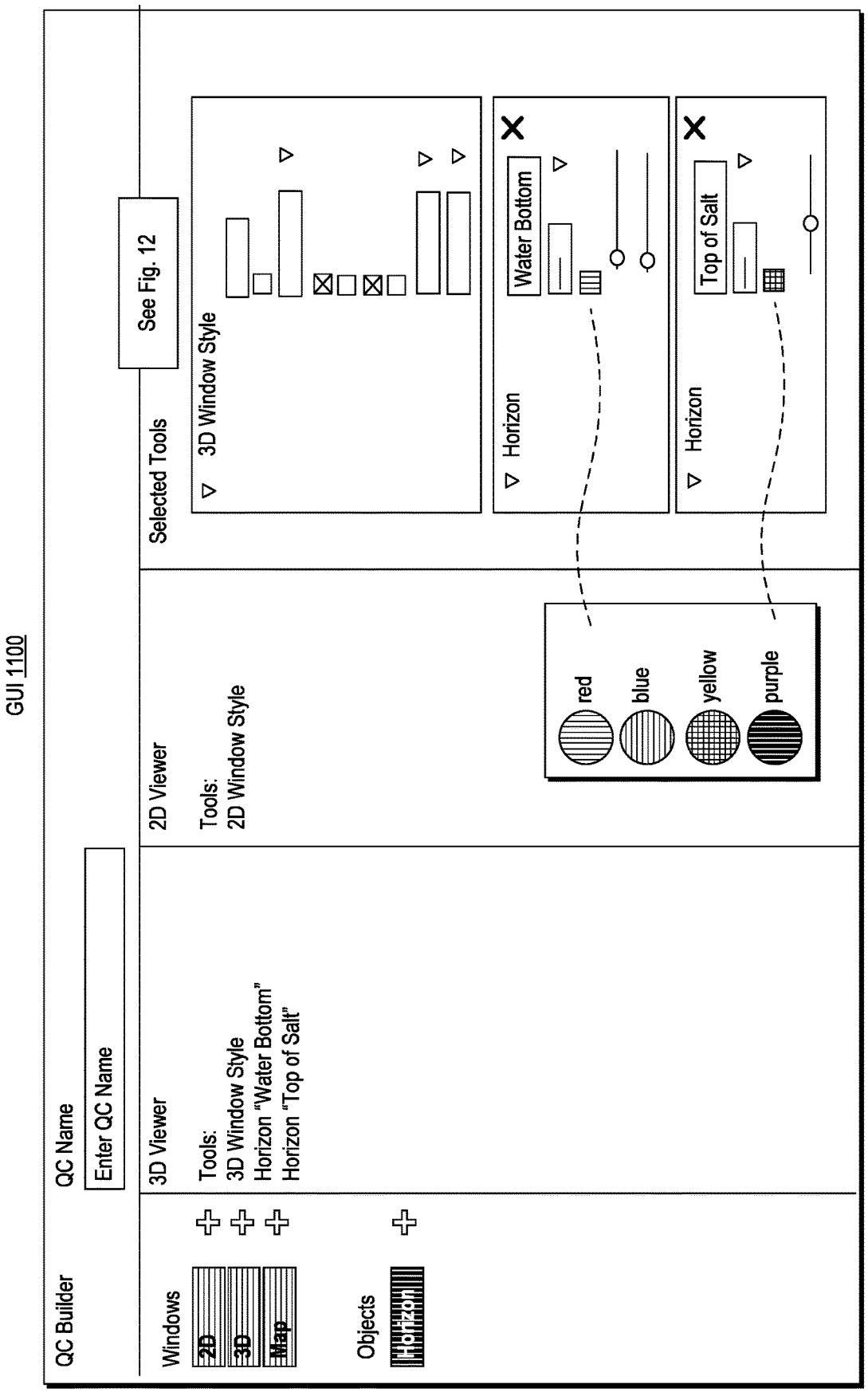
FIG. 11 illustrates an example of a graphical user interface.

FIG. 11 shows an example of a GUI 1100 of a framework that includes a 3D viewer window, a 2D viewer window and a selected tools panel that can be utilized to specify how rendering is to occur for the windows. For example, a 3D window style can be specified. In the builder tool GUI 1100, a leftmost panel includes the 2D, 3D and Map graphics along with an objects graphic for a horizon. As shown in the selected tools panel, aspects of a horizon or horizons can be specified. For example, in an object-oriented programming language or other type of programming language of a computational framework, a horizon can be represented computationally as an object. For example, where a seismic survey generates seismic data that seismic data can include evidence of a reflector that reflects seismic energy (e.g., an event). The reflector may be a horizon. Where the horizon is identified in the seismic data, for example, via interpretation, the location of the reflector/horizon may be specified, which may be represented as a series of points, lines, etc., that are "picked" from a rendering of a portion of the seismic data to a display. The picked horizon can be represented as an object that can be stored and instantiated by a computational framework for purposes of rendering to a display and/or one or more other purposes (e.g., model building, etc.). A workflow may aim to pick multiple horizons that correspond to different layers of material in the Earth (e.g., different reflectors). As an example, horizons may form a "layer cake" type of model of a subsurface environment as may have been formed by deposition of material over a geological time frame. As other geological phenomena may occur during such a time frame, the layers may deviate from horizontal, as may be characterized, for example, by dip, etc. As an example, salt may rise from one region to another where the salt forms a salt body that alters layers below, even and/or above the salt. Accordingly, a subsurface environment can be complex, with multiple types of structural features.

In the example of FIG. 11, some examples of colors are indicated, which can include indications as color linings per former 37 CFR 2.52(e), which is referenced in the Federal Register, Vol. 64, No. 173, Wednesday, Sep. 8, 1999, where red or pink are represented using vertical black lines on white ground, blue is represented using horizontal black lines on white ground, violet or purple are represented using vertical brick pattern white lines on black ground, yellow or gold are represented using horizontal hatch (crossed) black lines on white ground, green is represented as diagonal lines, etc. In the example GUI 1100, various colors may be rendered according to one or more parameter settings, which may correspond to parameters of an object, objects, etc., of one or more applications.

As shown in the example GUI 1100, the leftmost column includes "Windows" as 2D, 3D and Map in a color and "Objects" in another color, for example, to facilitate navigation of the GUI 1100. As to the horizons in the rightmost column, the colors indicated (see also FIG. 12) can be selected from one or more color palettes, etc. As the GUI 1100 is shown in black and white, hatchings are utilized to indicate how the GUI 1100 can utilize and/or set colors.

Figure 12:
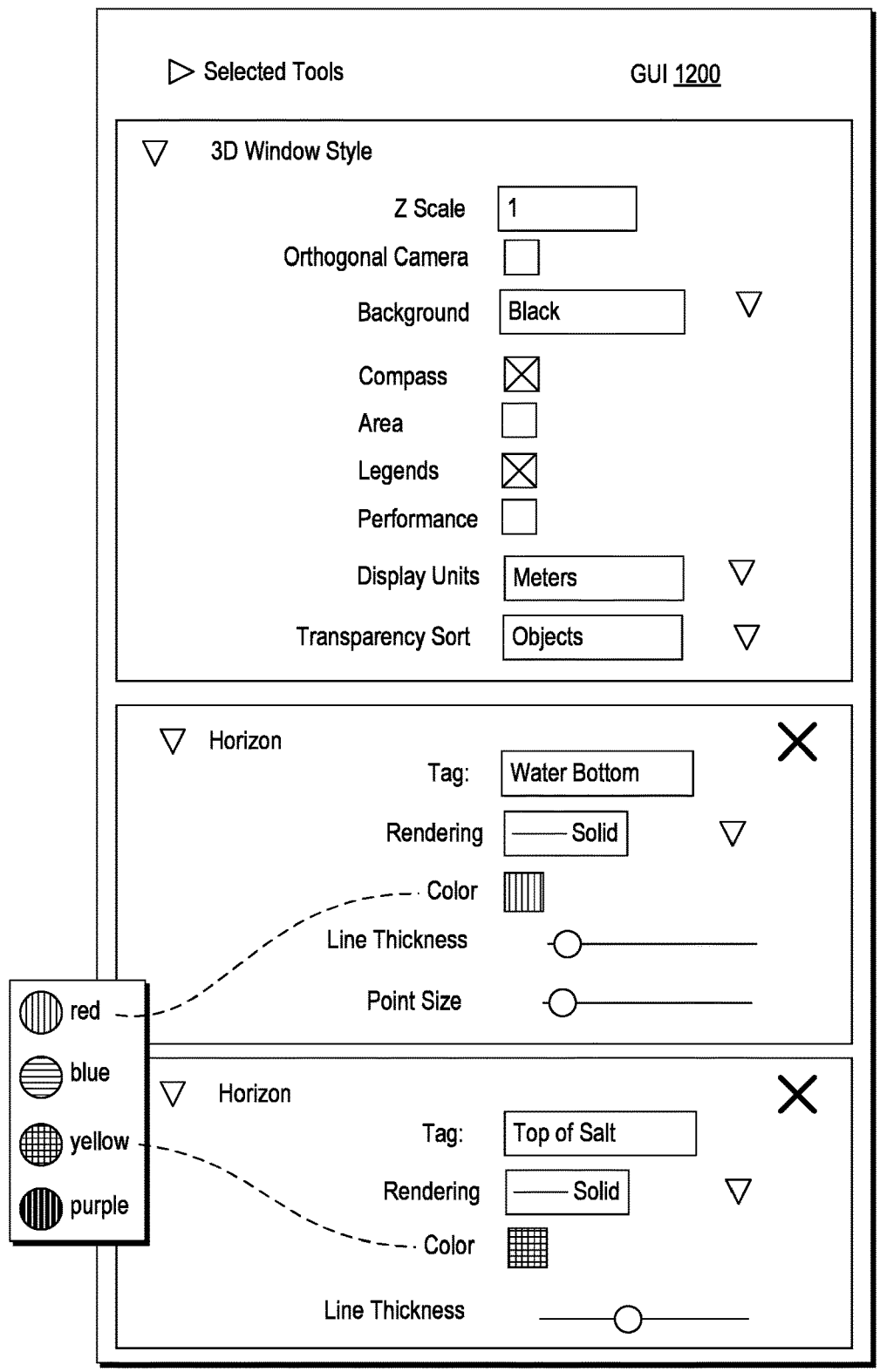
FIG. 12 illustrates an example of a graphical user interface.

FIG. 12 shows an example of a GUI 1200 as an example of the selected tools panel of the GUI 1100 of FIG. 11. As shown, the 3D window style can include a Z scale value, an orthogonal camera viewing (perspective) feature, a background color (e.g., black), a compass, an area, legends, performance indicia, display units, and objects, etc. As shown, a user may review the settings and/or modify the settings. For example, units may be changed to be different than meters, the background color may be changed to be different from black, etc. As to horizons, each horizon may be specified using a tag, which corresponds to a structural feature. For example, a water bottom tag can be utilized for a horizon that corresponds to the ocean floor (e.g., ocean bottom or sea bottom). As another example, a "top of salt" tag may be utilized to specify a "horizon" that corresponds to a top of a salt body. In the example GUI 1200, the water bottom horizon is to be rendered in red while the top of salt horizon is to be rendered in yellow. Further, note that line thickness may be selected as well as type of line, which may be solid, dashed, dotted, etc. For purposes of QC, if the QC relates particularly to top of salt being properly picked from seismic image data, a user may pay attention to creation of a color scheme that acts to differentiate top of salt from other "horizons". For example, a thicker line may be utilized along with a color that stands out from others and/or a background color as may be part of a 3D window style, a 2D window style, etc.

Figure 13:
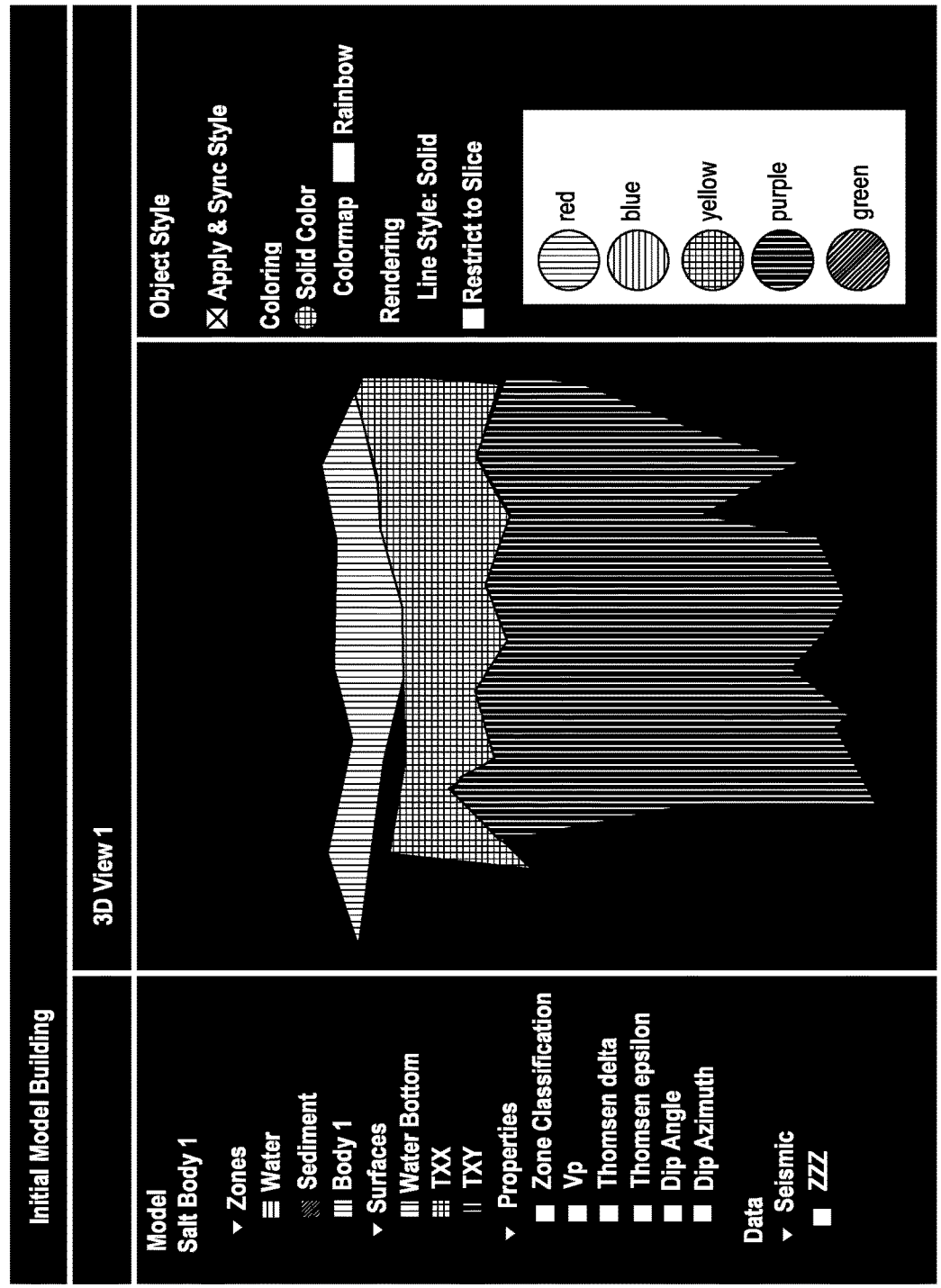
FIG. 13 illustrates an example of a graphical user interface.

FIG. 13 shows an example of a GUI 1300 that includes a 3D window that includes various colored renderings of structural subsurface structures, including a water bottom and materials TXX and TXY, which may be associated with salt. While particular specific properties are shown in the example of FIG. 13 (e.g., Vp, Thomsen, dip, etc.), these can depend on a workflow being performed, computational framework(s) being utilized, etc. The GUI 1300 may include template setting for at least one property, which may be, depending on specified settings of a template, applied in multiple windows, windows panels, etc. (e.g., multiple views, tables, etc.). For example, consider Thomsen delta property values being harmonized (e.g., synchronized) across a plurality of views rendered to a display according to template settings. Such an approach may enhance one or more quality control processes that are being performed by a user (e.g., to allow for a window to window comparison using a common color scale for property values, etc.). As shown in the example of FIG. 13, the GUI 1300 can include various selectable items that are to be rendered where rendering can be performed according to a template such as a template built using a GUI as in FIG. 9, FIG. 10, FIG. 11, or FIG. 12. As an example, the GUI 1300 and the GUIs 900, 1000, 1100 and 1200 may be accessible via the GUI 700 of FIG. 7.

As shown in FIG. 13, the various windows include various types of windows of at least one computational framework. A GUI can include a plurality of windows where such windows are arranged and/or controlled according to a template. For example, windows can be arranged and/or controlled according to a template created using a windows builder panel of a framework that can generate and save specifications for how windows are to be rendered (e.g., arranged, styled, etc.).

Figure 14:
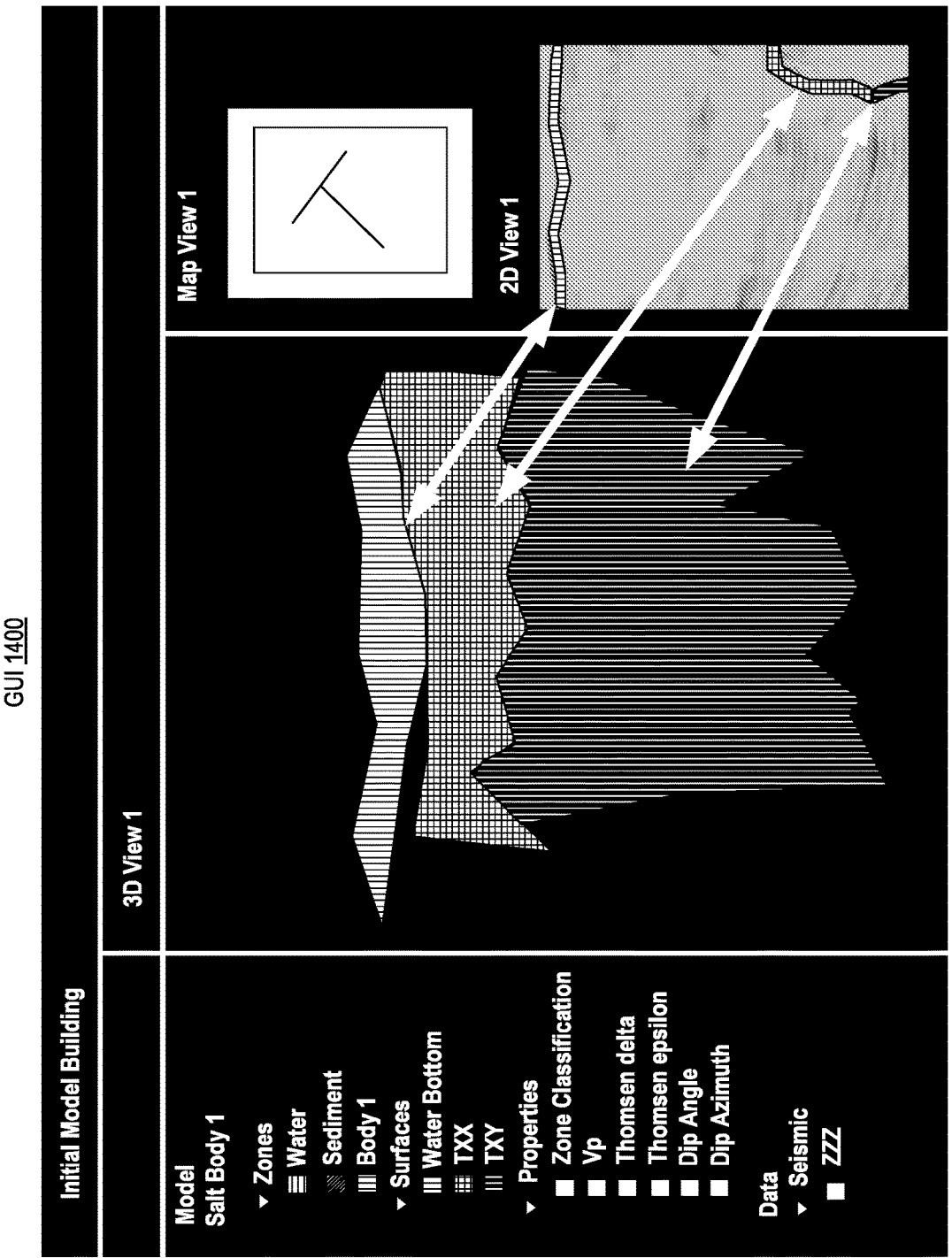
FIG. 14 illustrates an example of a graphical user interface.

FIG. 14 shows an example of a GUI 1400, which includes features of the GUI 1300 along with a map window and a 2D window, which are positioned with respect to the 3D window. As shown, a comparison may be readily made between the picked "horizons" in the seismic data as rendered in the 2D window and the rendered 3D structures in the 3D window as common colors are utilized. The water bottom is shown in red while other structural features are in yellow and magenta. A user may confirm further using a map and location(s) rendered in the map view, which may pertain to a particular "slice" of a seismic data cube that corresponds to the rendering in the 2D window.

As an example, a computational framework can execute remotely such as in a cloud environment (e.g., cloud-based resources of a cloud platform, etc.) where the computational framework includes various tools that can control views. For example, consider a camera icon of a view tool that can be rendered with a view of a model, data, etc., where the camera icon can be adjusted to cause the view tool to alter the view being rendered to be from a particular perspective. Such a tool may include features such as one or more of zoom, pan, rotate, fly-through, etc. As an example, a template can link a tool across multiple views, which may be views from multiple computational frameworks. In such an example, the template can provide instructions that cause a change in a view of one computational framework to be replicated by a change in a view of another computational framework. As an example, a computational framework may generate a view and then transmit the view via a network. For example, consider a computational framework that generates a vector graphics view that can be transmitted as a pixel image for rendering by a GUI of a workspace environment (see, e.g., the GUI 700 of FIG. 7). In such an example, where a view tool is available in the GUI of the workspace environment, use of the view tool can transmit instructions according to template specifications to cause each of two or more different computational frameworks to generate corresponding views where those views (e.g., pixel image, vector graphics, etc.) are transmitted for viewing in the GUI of the workspace environment. In such an example, a view tool can be synchronized such that viewing settings are effectively shared (e.g., rotation, zooming, panning, etc.) and automatically applied to multiple views.

As an example, a GUI can provide for copy and paste of setting, which may be applied to a template such that the template can be saved, accessed and re-used to apply those settings. For example, consider a GUI such as the GUI 1400 of FIG. 14 where a color scheme of the 2D view is to be applied to the 3D view via a copy and paste method. In such an example, a user may select and copy the 2D view color scheme settings (e.g., via a keystroke, mouse, menu, etc.) and paste those settings to the 3D view such that the 3D view adopts the same color scheme. In such an example, the views may be rendered by operations of different computational frameworks. In such an example, a save command may be used such that the settings are saved to a template such that the two computational frameworks render views with a color scheme according to the settings of the template.

As an example, a view can include one or more objects where one or more of the objects can be selected, style copied and pasted to another object and/or view. For example, consider features that provide the ability of copying a defined style for a given object in a 3D window to a similar object type in a different 3D panel. As an example, a copy/paste approach may be provided for at least a portion of styling of a panel to another panel. For example, consider a menu that includes a list of styling features of a panel where a user may select one or more of the styling features to be copied and pasted to another panel.

Figure 15:
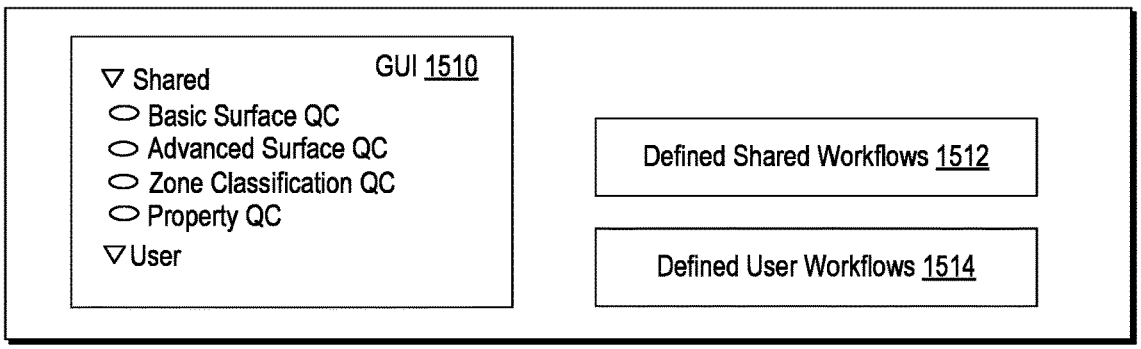
FIG. 15 illustrates examples of graphical user interfaces.
Figure 15:
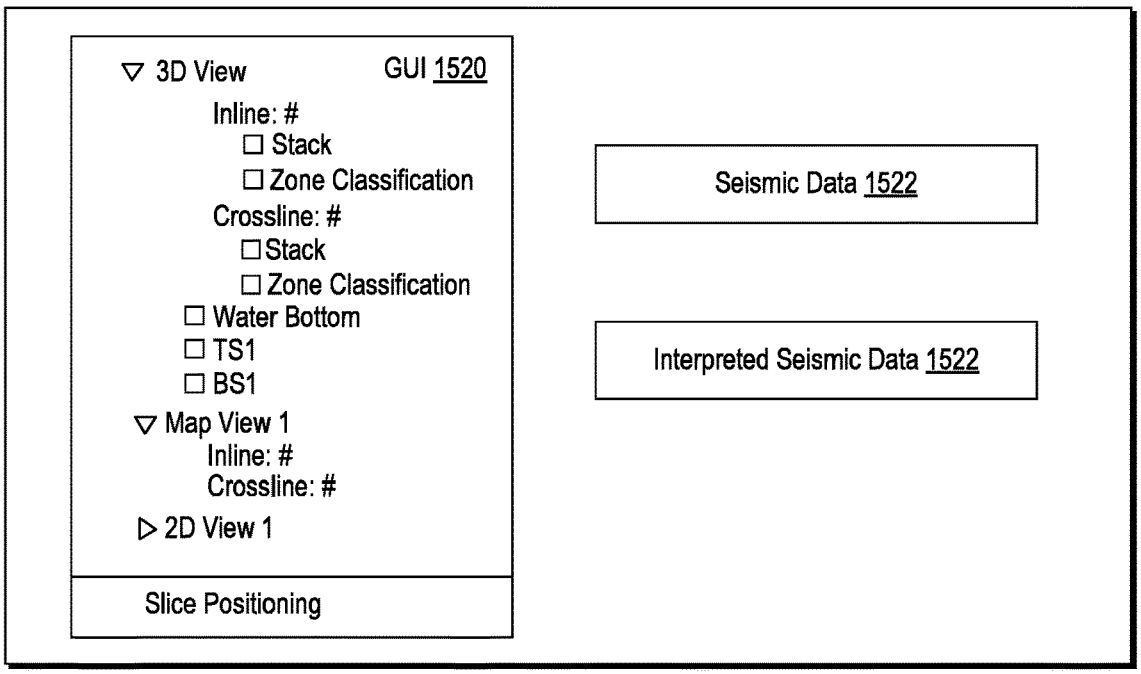
Figure 15:
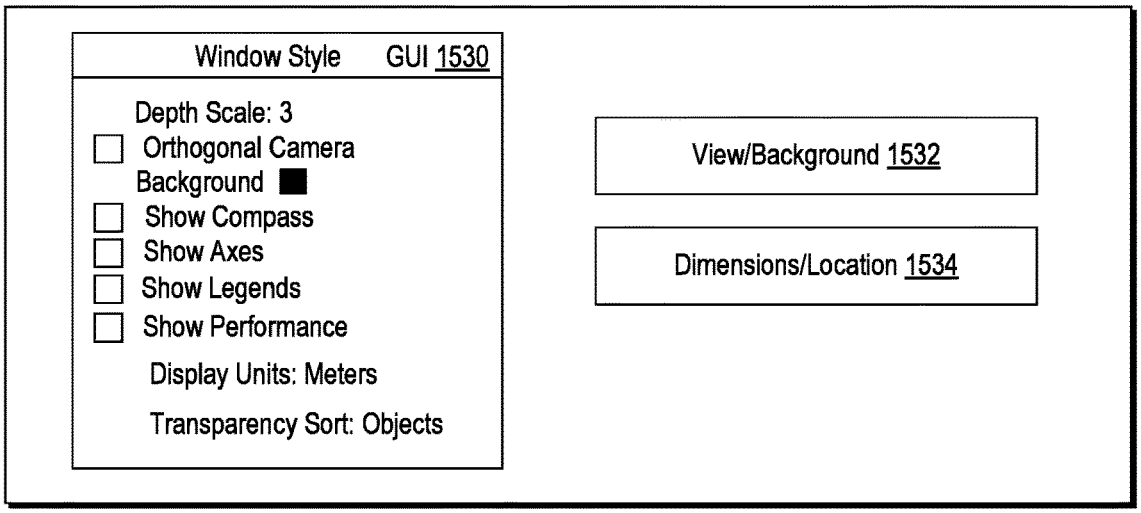

FIG. 15 shows various example graphical user interfaces (GUIs) 1510, 1520 and 1530. As shown, the GUI 1510 can provide for rendering of various graphical controls for selection of one or more types of defined workflows, which can include shared workflows 1512 and user specific user workflows 1514. For example, consider a basic surface quality control workflow, an advanced surface quality control workflow, a zone classification workflow and a property quality control workflow. In such an example, each of the workflows can be associated with a corresponding template file, which can be, for example, a file that includes instructions, information, etc., in a JSON format such that the file can be referred to as a JSON file. Upon selection of one of the graphical controls, a framework can access and load the content of the template file such that various settings and/or logic are utilized for rendering one or more GUIs to perform the workflow. As a zone classification workflow can differ from another workflow, specific views, colors, color schemes may be utilized such that data can be more readily examined, interpreted, marked, processed, etc., for purposes of quality control, which may include identifying one or more zones, quality controlling one or more identified zones, etc.

As to the example GUI 1520, it can provide for generating renderings that utilize seismic data 1522 that may be for purposes of interpretation of seismic data. As an example, the GUI 1520 can provide for generating renderings of interpreted seismic data (e.g., picked seismic data, etc.). As shown, the GUI 1520 can include various types of information such as line and crossline numbers for one or more slices of data of a 2D and/or a 3D dataset. As explained, one or more colors may be assigned according to a template file such as color of water bottom renderings, color of top of salt renderings (TS1), color of bottom of salt renderings (BS1).

As to the GUI 1530, it can provide for various views and/or backgrounds 1532 and/or dimensions and/or locations 1534. For example, as to a view, consider use of an orthogonal camera where a camera angle may be controlled via a GUI. As to background, a contrasting color such as black may be chosen (e.g., depending on nature of a workflow's tasks, data types, etc.). As to dimensions, a window style can include compass markings, axes, units, etc. Where seismic data are from a particular region, one or more coordinate systems may be utilized for rendering coordinate information in a GUI. As an example, one or more of the settings in the GUI 1530 may be set via use of a template file.

Figure 16:
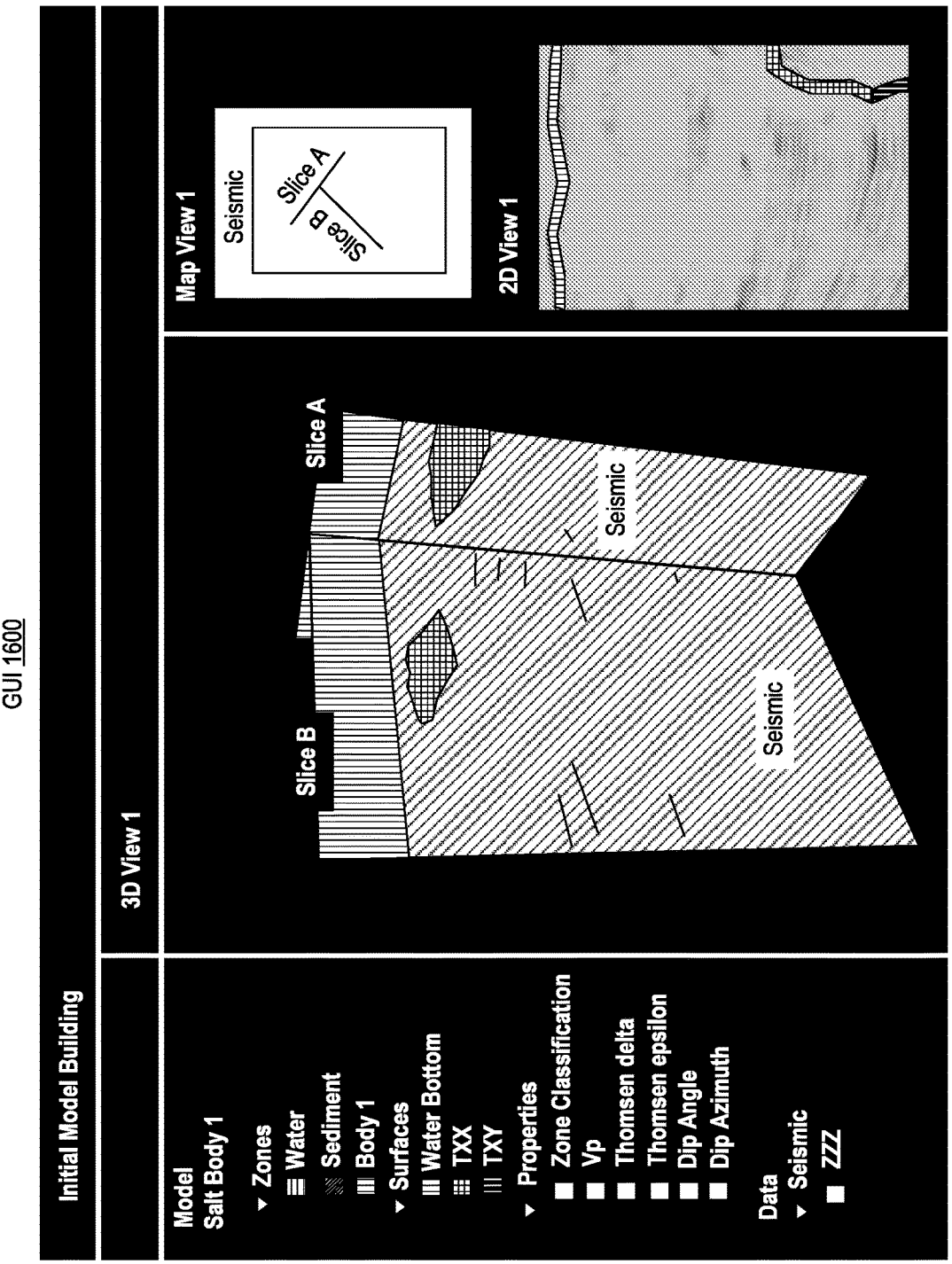
FIG. 16 illustrates an example of a graphical user interface.

FIG. 16 shows an example of a graphical user interface 1600 that includes various features rendered according to information in a template file. As shown, the GUI 1600 includes a 3D view (3D View 1) with slice A and slice B from an interpreted seismic dataset and includes a map view (Map View 1) with a plan view (e.g., surface view looking downwardly toward the Earth) that shows seismic slices A and B as oriented in the map view perspective. Additionally, a 2D view is rendered, which includes various color markings that correspond to structural features in the Earth that can be represented using an object representation scheme such as, for example, in an object-oriented programming language approach. For example, an interpretation application can provide for rendering of seismic slices whereby an interpreter can pick features that represent structure in the Earth. As mentioned, features can include horizons, salt bodies, faults, etc. In the 3D view and the 2D view of the GUI 1600 of FIG. 16, the identified features are commonly colored such that a user may readily compare how structures are shaped from different perspectives. As explained, such common coloring and arrangement of views can facilitate performance of a workflow such as, for example, a quality control workflow. Where a user is expected to process a relatively large amount of data iteratively, consistency between iterations in views, colors, etc., can make the process more ergonomic. For example, a user may be less stressed, experience less eyestrain, be able to assess data with fewer interactions (e.g., mouse clicks, touches, etc.).

Figure 17:
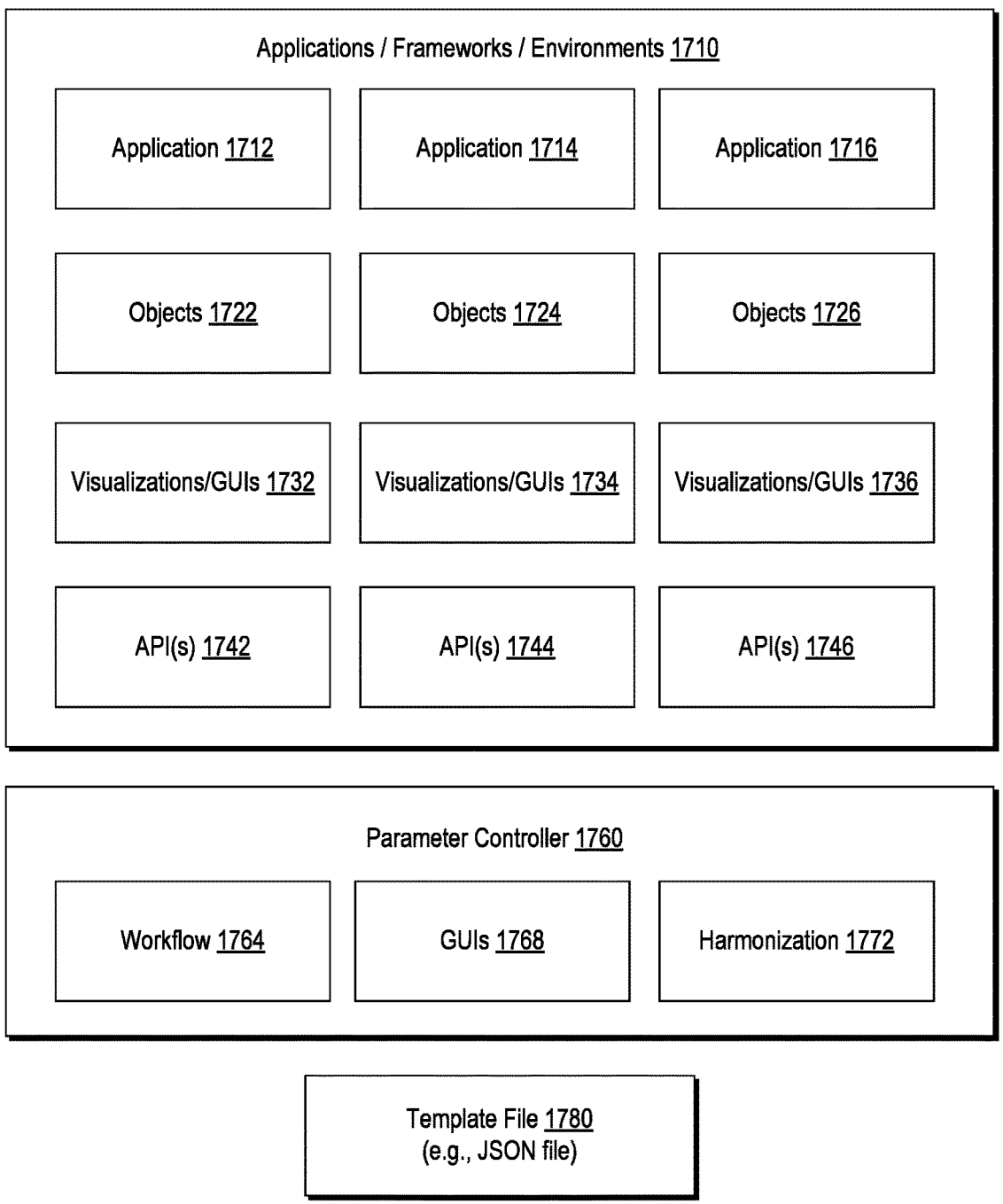
FIG. 17 illustrates an example of a system.

FIG. 17 shows an example of a system 1700 that includes applications, frameworks and/or environments 1710 where a plurality of applications 1712, 1714, and 1716 can each include objects 1722, 1724 and 1726, along with various visualizations and/or GUIs 1732, 1734 and 1736 and optionally one or more application programming interfaces 1742, 1744 and 1746. As shown, a parameter controller 1760 can provide for workflow parameter control 1764, GUI parameter control 1768 and/or harmonization of parameters control 1772. In the example of FIG. 17, the system 1700 can output a template file 1780, which may be, for example, a JSON file. As an example, the parameter controller 1760 may be configured to generate the template file 1780 or at least contents thereof.

As an example, the parameter controller 1760 can access information pertaining to the applications 1712, 1714 and 1716 and generate settings that can include common settings across the applications 1712, 1714 and 1716. As explained, an object in one application may be renderable according to a color setting and an object in another application may be renderable according to a color setting. In the example of FIG. 17, the parameter controller 1760 can provide for making the color settings the same such that a graphical user interface can be rendered using objects from two or more of the applications 1712, 1714 and 1716 where related objects utilize a common color. As mentioned, related objects may be a top of salt object in one application and a top of salt object in another application. In such an example, one application may be a seismic data interpretation application and the other application may be a model building application that aims to build a structural model (e.g., an Earth model). A workflow can include, for example, quality controlling model building to assure that a model feature is aligned with a seismic data feature. Where a common color is utilized for objects that represent the features, the quality control workflow can be more accurate and more ergonomic. Such an approach can help to automate a quality control workflow as a user may not have to navigate various menus for parameter settings to make objects renderable in a desired common color. For example, a predefined template file for a workflow may be accessed and utilized and/or a GUI framework of a parameter controller may be utilized (e.g., a drag-n-drop type of GUI, a GUI that renders various objects, object types, object rendering options, etc.).

As explained, a parameter controller 1760 can provide for harmonization of renderings through parameter settings. As an example, one or more logic rules may be applied for purposes color selection, view selection, etc. For example, where a "water bottom" object is selected to be rendered using red as a parameter setting, logic may automatically set a "top of salt" object parameter to be in a contrasting color such as, for example, yellow.

As an example, an organization may adopt a common color scheme for various objects. In such an example, the organization may utilize one or more third party and/or internal applications where objects can be assigned parameter values for purposes of rendering. Where the organization adopts a common color scheme, it may do so using a parameter controller that generates a template file, which may be available upon instantiation of one or more of the applications. Where different organizations bid for work, they may present information using an organization specific color scheme or they may adopt a color scheme of the entity that is seeking bids. In such an example, the entity seeking bids may provide a template file to the organizations such that their works (e.g., presentations, demonstrations, etc.) are rendered using a color scheme that is readily understood, which may help to assess the bids.

In the example of FIG. 17, the parameter controller 1760 may utilize one or more of the APIs 1742, 1744 and 1746. For example, the parameter controller 1760 may make one or more API calls that can return information about objects, visualizations, etc., capabilities of one or more of the applications 1712, 1714 and 1716. For example, consider an API call that requests information concerning an object hierarchy where an application can respond by providing the parameter controller 1760 with its object hierarchy. Where the parameter controller 1760 can make such calls and/or otherwise access, request, etc., such information, the parameter controller 1760 may organize parameters for purposes of rendering. For example, the parameter controller 1760 may discover objects and relate objects such that parameter settings can be harmonized for purposes of rendering one or more GUIs.

As to the workflow parameter control component 1764 of the parameter controller 1760, it may coordinate a progression of GUIs. For example, views may change upon completion of a workflow action. In such an example, the parameter controller 1760 can assure that as a view changes responsive to completion of a workflow action, the new view is rendered according to desired parameter settings, as may be specified in the template file 1780. In such an approach, a template file may include sets of parameter settings where each of the sets corresponds to a particular portion of a workflow. As a workflow progresses, an object may be rendered that was not rendered in a prior portion of the workflow or, for example, an object may be rendered that is to be rendered in a color that differs from that of a prior portion of the workflow (e.g., to signify that the object has been assessed for quality control purposes, etc.).

As to the harmonization of control parameters component 1772 of the parameter controller 1760, it may provide for harmonizing object parameter settings across two or more applications, optionally automatically. For example, consider automatically setting a parameter setting for related objects to a default value, a value of a color scheme, etc. As an example, a user may utilize the parameter controller 1760 for rendering a parameter control framework GUI where the user may review harmonized parameter settings and optionally change one or more of the harmonized parameter settings. In such an example, a user may change a color, de-harmonize, etc. Upon completion of such review, edits, etc., the user may instruct the parameter controller 1760 (e.g., via the parameter control framework GUI) to generate a template file (e.g., using a default file name, a specified file name, etc.).

Figure 18:
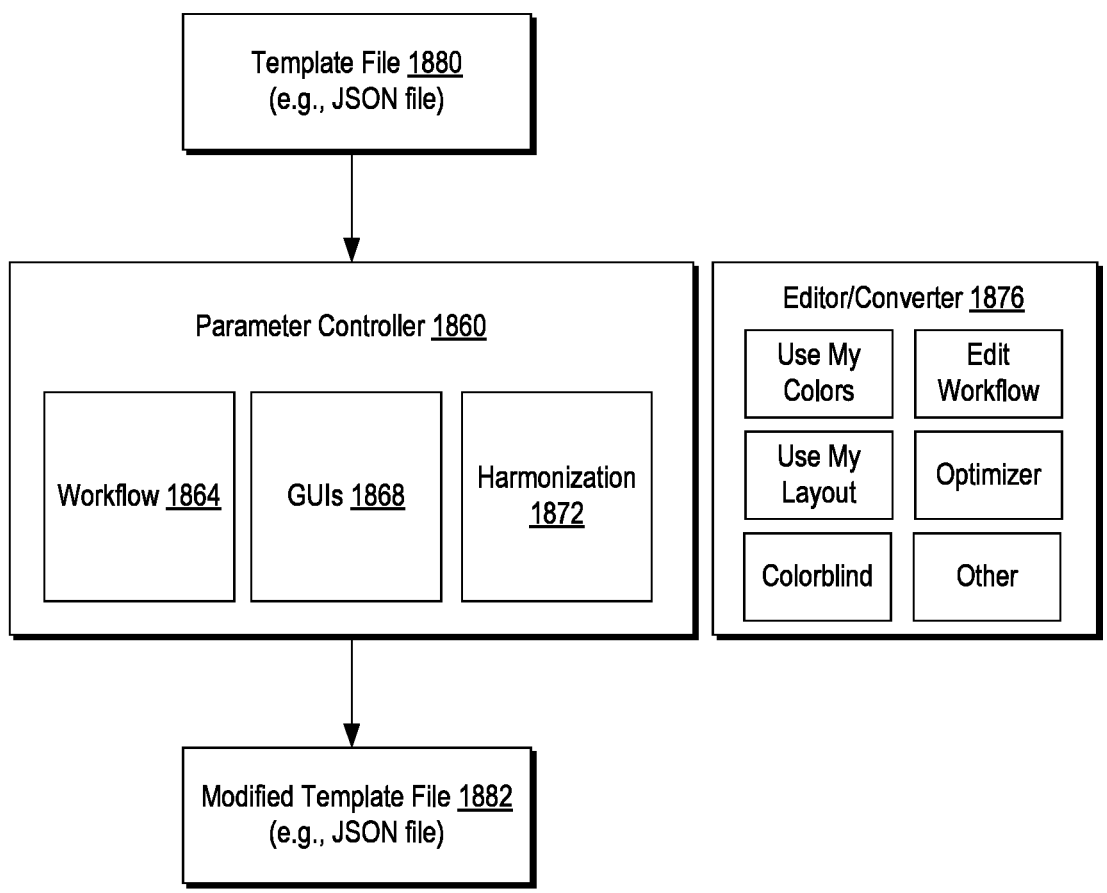
FIG. 18 illustrates an example of a system.

FIG. 18 shows an example of a method 1800 that includes a provision block 1802 for providing a template file, a consumption block 1804 for consuming the template file, a render block 1806 for rendering one or more GUIs according to the template file, and a commencement block 1808 for commencing a workflow using at least one of the one or more GUIs.

FIG. 18 shows an example of a system 1800 that includes a parameter controller 1860 with workflow, GUIs and harmonization components 1864, 1868 and 1872, an editor and/or converter 1876 and a modified template file 1882. As an example, the parameter controller 1860 can be or include one or more builder tool features and/or be part of a builder tool framework, etc. As shown, the editor and/or converter 1876 can provide various options to edit and/or convert the template file 1880. For example, consider a "use my colors" option, a "user my layout" option, a colorblind color scheme option, an edit workflow option, an optimizer option (e.g., to optimize colors, to optimize a workflow, etc.), and one or more other options. In such an example, where an organization utilizes an organization specific template file and a user is colorblind, the user may implement the editor and/or converter 1876 to automatically modify the template file 1880 such that colors utilized are suitable for one or more types of colorblindness. In such an example, the user can perform a workflow using a multi-application platform where views can include mixed application views where related objects are rendered in a common color, etc.

Figure 19:
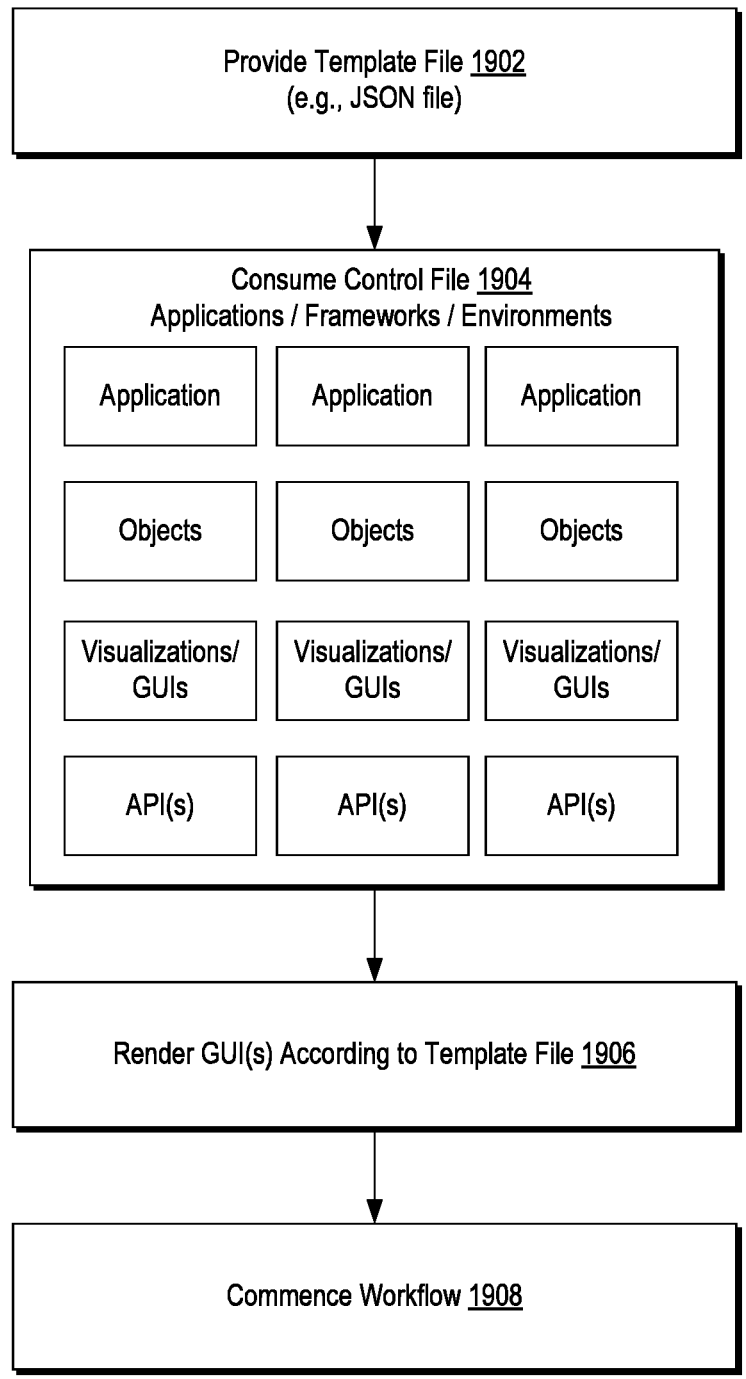
FIG. 19 illustrates an example of a method.

FIG. 19 shows an example of a method 1900 that includes a provision block 1902 for providing a template file, a consumption block 1904 for consuming the template file, a render block 1906 for rendering one or more GUIs according to the template file, and a commencement block 1908 for commencing a workflow using at least one of the one or more GUIs.

Figure 20:
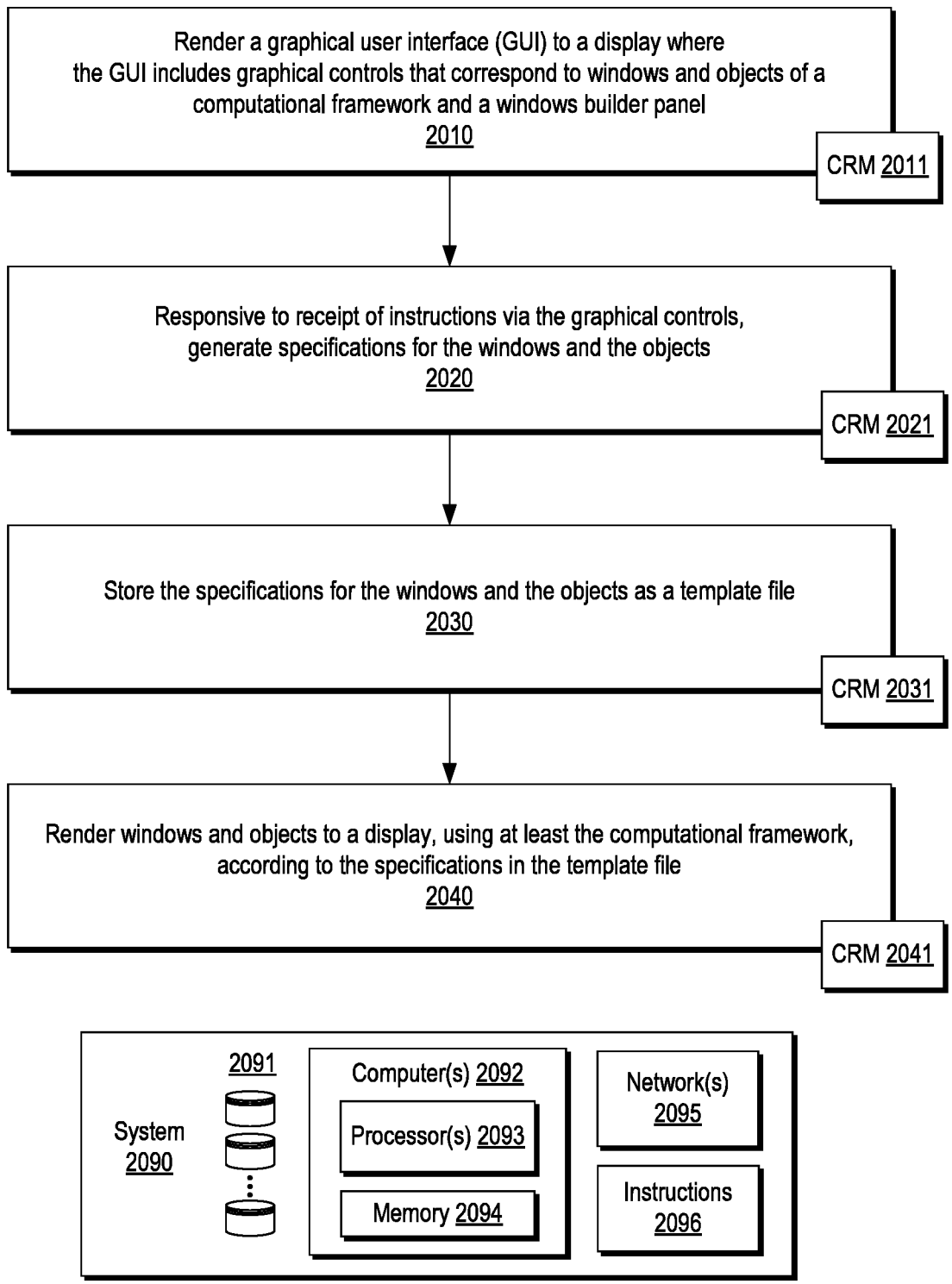
FIG. 20 illustrates an example of a method and an example of a system.

FIG. 20 shows an example of a method 2000 that includes a render block 2010 for rendering a graphical user interface (GUI) to a display where the GUI includes graphical controls that correspond to windows and objects of a computational framework and a windows builder panel; a generation block 2020 for, responsive to receipt of instructions via the graphical controls, generating specifications for the windows and the objects; and a storage block 2030 for storing the specifications for the windows and the objects as a template file. As shown, the method can include a rendering block 2040 for rendering windows and objects to a display, using at least the computational framework, according to the specifications in the template file.

The method 2000 is shown as including various computer-readable storage medium (CRM) blocks 2011, 2021, 2031, and 2041 that can include processor-executable instructions that can instruct a computing system, which can be a control system, to perform one or more of the actions described with respect to the method 2000.

As shown in the example of FIG. 20, a system 2090 can include one or more computers 2092 that include one or more processors 2093, memory 2094 operatively coupled to at least one of the one or more processors 2093, instructions 2096 that can be, for example, stored in the memory 2094, and one or more interfaces 2095. As an example, the system 2090 can include one or more processor-readable media that include processor-executable instructions executable by at least one of the one or more processors 2093 to cause the system 2090 to perform actions such as, for example, one or more actions of the method 2000. As an example, the instructions 2096 can include instructions of one or more of the CRM blocks 2011, 2021, 2031, and 2041. The memory 2094 can be or include the one or more processor-readable media where the processor-executable instructions can be or include instructions. As an example, a processor-readable medium can be a computer-readable storage medium that is non-transitory that is not a signal and that is not a carrier wave.

Figure 21:
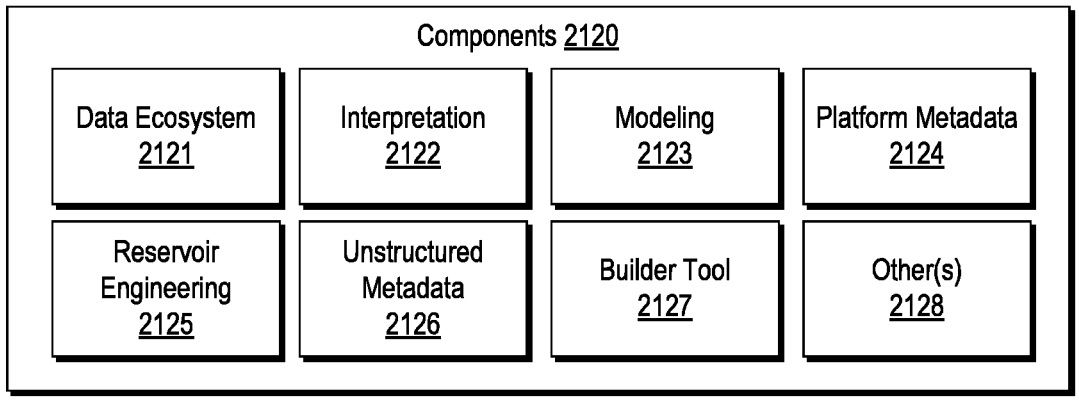
FIG. 21 illustrates an example of a system and an example of a method.
Figure 21:
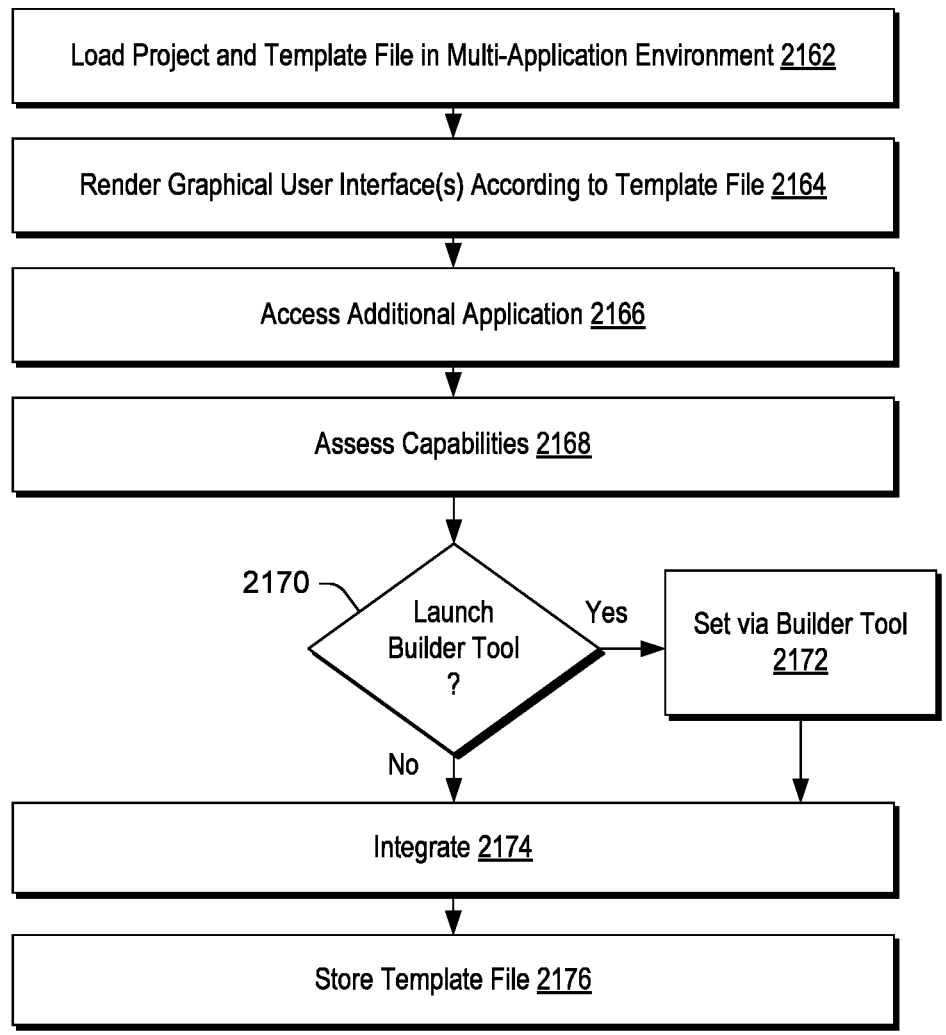

FIG. 21 shows an example of a system 2100 and an example of a method 2160. As shown, the system 2100 can include various components 2120, which may include one or more of a data ecosystem component 2121, an interpretation component 2122, a modeling component 2123, a platform metadata component 2124, a reservoir engineering component 2125, an unstructured data component 2126, a builder tool component 2127 and one or more other components 2128.

As an example, the components 2120 can include features for utilization in a distributed computing environment, which can include one or more cloud-based resources (e.g., compute, storage, control, etc.). The components 2120 can include one or more APIs. For example, the component 2121 can include one or more APIs to access a data ecosystem environment where instructions can provide for retrieval of data, contextual information related to data, etc. As to the component 2122, it can include one or more APIs for access to interpretation data, which may be from one or more data management systems. As to the component 2123, it can include one or more APIs for access to modeling data from one or more data management systems. As to the component 2124, it can include one or more APIs that can provide access to project data for one or more applications that may be suitable for use in a multi-application environment where such project data can include various parameters, revision history, ownership, legal status/legal tags (e.g., compliance, restrictions, etc.), etc. As to the component 2125, it can include one or more APIs for access to a reservoir engineering project, which can include features for access to various types of data and/or metadata such as, for example, simulation data from one or more reservoir simulators, which may be via one or more search features (e.g., query-based searches, relational searches, metadata-based relationships, etc.). As to the component 2126, it can include one or more APIs for access to files in an unstructured data format and/or one or more other types of formats, which may act to facilitate data discovery capabilities.

As an example, the builder tool component 2127 can include features for rendering a graphical user interface (GUI) to a display where the GUI includes graphical controls that correspond to windows and objects of a computational framework and a windows builder panel. In such an example, responsive to receipt of instructions via the graphical controls, the builder tool component 2127 can generate specifications for the windows and the objects and, for example, provide for storing the specifications for the windows and the objects as a template file. As an example, the builder tool component 2127 can include one or more APIs, which may be configured to perform one or more functions. For example, consider an API that can utilize one or more of the aforementioned APIs of the example components 2120. In such an example, the builder tool component 2127 may access specifications as to ecosystem data, interpretation, modeling, projects, reservoir engineering, unstructured data, etc. For example, consider an object discovery method where the builder tool component 2127 may discover object parameters where such parameters may be utilized in a computerized rendering process to render one or more representations of an object to a display.

As an example, the builder tool component 2127 may access one or more types of data, data objects, object parameters, GUI parameters, etc. Such an approach can include automated updating to assure that the builder tool component 2127 can accommodate one or more changes in one or more data models for one or more applications. For example, as a data model expands, an application may expose and/or a builder tool component may discover definitions of data types, properties, methods for access, etc.

As explained, in the PETREL framework, a project can include data elements that represent various types of entities (e.g., a well, a surface, a reservoir, etc.). Such entities may be characterized by one or more properties (e.g., a log along a borehole, height fields across a surface, porosity distributions in a reservoir, etc.). Data elements may be exposed by classes such as domain objects where an entity instance carries geometric information of an object it represents (e.g., spatial information, etc.) and a property object carries property values (e.g., sensor measured values, attribute values, etc., as may be representative of materials such as rocks, fluids, etc.). As an example, a property object can be associated with an individual application template, which can include settings that determine how to display one or more property values (e.g., consider units, scale, and color table).

As an example, an application can utilize a data model that includes a hierarchy or tree-like structures. For example, consider project trees for input, models, results, cases, templates, and processes. As an example, data may be organized in a folder-like structure, which may be expandable and contractable (e.g., "Wells" expandable to "Well A", "Well B", etc.).

As an example, data may be organized in one or more collections. For example, consider a borehole collection that includes boreholes, logs, and completions; a marker collection that includes a geology data model (e.g., markers, horizons, zones, and fluid contacts); a seismic collection (e.g., 3D and 2D seismic collections); an interpretation collection for seismic interpretation; one or more generic collections (e.g., point sets, polyline sets, and surfaces); a model collection that includes a models tree that enumerates models (e.g., pillar grids, etc.); a grid property collection that may be specific to each model (e.g., property and fault property instances in a model); a fault properties collection that lists fault properties (e.g., in a pillar grid model, etc.); etc.

As to a borehole collection, consider the following code segment or method of a WellRoot class:

```
Project proj = PetrelProject.PrimaryProject;
WellRoot wr = WellRoot.Get(proj);
// Get top level Borehole Collection
BoreholeCollection bhcol = wr.BoreholeCollections;
```

Such code may provide access to borehole and marker collections such as, for example:

```
public sealed class WellRoot : ...
{ ...
public BoreholeCollection BoreholeCollection { get; }
public int WellLogVersionCount { get; }
public IEnumerable<PropertyVersion> WellLogVersions { get; }
public int MarkerCollectionCount { get; }
public IEnumerable<MarkerCollection> MarkerCollections { get; }
}
```

As an example, for an individual application templates may be structured in a templates tree that exposes templates that are utilized by that individual application, which may define data types for domain objects in a project of that individual application. In some instances, a template may be domain agnostic or otherwise suitable for multiple domains. For example, a porosity template may be used to represent data for a porosity well log as well as a porosity property of a pillar grid. As to some examples of individual application templates of the PETREL framework, consider "volume templates", "production templates", "seismic color tables", "2D log templates", "geometrical templates", and "discrete property templates".

As an example, for an individual application, processes may be exposed in a process tree structure. For example, consider a processes tree that exposes the processes used by a user of that single application to perform various actions on data. As an example, a process can be interactive in nature in that activating one process causes a process toolbar on in a GUI to update to indicate the tools that are available to the process. In the PETREL framework, some examples of processes include input, stratigraphy, geophysics, structural framework, corner point gridding, property modeling, upscaling, fracture network modeling, well engineering, simulation, utilities, and plug-ins.

As mentioned, a quality control workflow can be a cross-application workflow. For example, consider viewing renderings of various data types (e.g., different objects) where the data types (e.g., different objects) may be associated with a plurality of different applications. In such an example, a template file can be utilized to harmonize views, including renderings therein, which can expedite quality control review by a user.

As an example, a method can include utilizing various panels for views such as, for example, multidimensional views. As an example, the Open Inventor, formerly IRIS Inventor, toolkit may be utilized for graphics. For example, consider an object oriented retained mode 3D graphics toolkit that can provide a higher layer of programming for OpenGL, which may be considered a low level API that takes lists of polygons and renders. As to other views, for example, map, intersection, interpretation, etc., a GDI+ toolkit may be utilized, which can provide for anti-aliased 2D graphics, floating point coordinates, gradient shading, complex path management, intrinsic support for formats like JPEG and PNG, and support for composition of affine transformations in the 2D view pipeline. The GDI+ toolkit may use ARGB values to represent color. As an example, the INT GeoToolkit may be utilized, for example, as to various types of data (e.g., well sections, etc.). The INT GeoToolkit includes a set of high-performance 2D/3D tools and libraries used in software applications to display seismic, log, schematic, contour, real-time data, etc.

As mentioned, the system 2100 can include one or more of the components 2120. For example, in a multi-application environment, the component 2121 may provide services to ingest metadata information generated by one or more applications into a data ecosystem. For example, a storage service can provide a set of APIs to manage a metadata life-cycle, which can include one or more of ingestion (persistence), modification, deletion, versioning and data schema setting.

As to the example method 2160 of FIG. 21, it can include a load block 2162 for loading a project and a template file in a multi-application environment; a render block 2164 for rendering one or more graphical user interfaces (GUIs) according to the template file; an access block 2166 for accessing an additional application; an assessment block 2168 for assessing one or more capabilities of the accessed additional application; a decision block 2170 for deciding whether to launch a builder tool (e.g., per the builder tool component 2127, etc.); a set block 2172 for setting one or more parameters using the builder tool, if launched; an integration block 2174 for integrating the capabilities of the additional application into a template file (e.g., via template file modification, etc.); and a storage block 2176 for storing the template file (e.g., a modified template file) to a digital storage medium.

In the example method 2160, the assessment block 2168 may utilize one or more techniques to assess the additional application. For example, consider using one or more APIs that expose one or more aspects of a data model of the additional application. In such an example, the data model can include objects and/or templates where one or more parameters may be exposed and/or discovered. For example, consider a horizon object that originates from an interpretation of seismic data where the horizon object includes one or more color parameters, along with spatial parameters. In such an example, the spatial parameters may be assessed with respect to the project loaded per the load block 2162 to determine if there would be a spatial overlap with one or more structural features of the project data. If so, the integration block 2174 may automatically set at least one parameter of the horizon object, for example, to set a color of the horizon object with respect to a seismic rendering (e.g., a seismic object, etc.). Such an approach may make a color common, make a color coordinated with a color scheme, make a color contrasting, etc. For example, a parameter may be automatically set with respect to one or more logical rules that can contextually associate objects across multiple applications.

As shown in FIG. 21, a builder tool may be launched, which may provide for user assessment of capabilities, how capabilities are to be automatically integrated, what options and/or suggestions may be available for integration, etc. For example, consider launching the builder tool such that a new view can be added in GUI (e.g., a new panel) that utilizes data of the additional application where a structurally relevant feature represented by such data can have one or more parameters set to harmonize an overall GUI with a plurality of views. In such an example, harmonize may mean to make a common color, utilize a color scheme (e.g., foreground, background, features, etc.), contrast a color (e.g., for better visualization, quality control, etc.), set a "camera" view angle, etc.

As explained, a template file may include instructions written in a format such as, for example, the JSON format. As an example, a browser application may be utilized as a front-end application for a multi-application environment and/or a GUI may operate using one or more types of browser compatible instructions. For example, consider a GUI that is rendered using browser rendering features within an application or applications.

As an example, loading (e.g., consuming) a template file can alter the state of an application that renders one or more GUIs to a display. As explained, a template file may provide for various appropriate settings such as, for example, one or more aspect ratios, one or more locations on a display, objects from a specific project to be drawn in the corresponding panels using style settings saved in the template file, etc.

As an example, a template file application can be part of a rendering application (e.g., browser features application, etc.) and/or within a data/instruction stream for a rendering application (e.g., within a rendering pipeline). In such an example, a template file application may be a plug-in, which can access parameters and generate a template file such that the template file can be utilized to recreate a view, recreate one or more workflow GUIs, etc. In such an example, the template file application may be responsible for loading a template file for purposes of view rendering. As an example, a template file application may include its own GUI or graphical control such as, for example, a button that can be actuated to capture a current state of a rendered visualization layout and object types with styles. In such an example, the template file application may cause rendering of a popup dialog or window that can allow a user to confirm one or more settings of how a template of the template file is to be used (e.g., consider a tag approach to confirmation, such as generating a user tag to be stored with or in association with a template file).

As explained, a builder tool may provide for control of settings as to tools, processes, objects, etc., which may be configured in one or more views of an application or applications.

As explained, a tool can be a camera, which may be a GUI tool that includes parameters such as zoom level and angle of view. In such an example, a template file may store one or more parameter settings for one or more views such that upon loading a project, a starting position of the camera can be set via loading the template file. Such an approach may also provide a user with an ability to resynchronize viewing perspectives, for example, after maneuvering a camera tool or camera tools for one or more views as rendered to a display. As an example, an option can exist to overwrite such view parameter settings or not, for example, upon exiting a project.

As mentioned, a method can include providing a multi-application environment where projects are stored and opening a project to cause loading of a template file where various parameter settings are utilized for rendering one or more views according to template file. In such an example, the method may upon a user closing a project, cause a template file to be updated, optionally revisioned (e.g., v.1.1, v.1.2, etc.), using a different name, etc.

As explained with respect to the method 2160, where user invokes an additional application (e.g., native to an environment, third party, etc.), one or more parameters may be assessed, for example, in an effort to make matches and/or optionally launch a builder tool such that the user can "integrate" one or more views, objects, etc., of the additional application. As an example, a builder tool, a template file application, etc., can provide for saving a template file automatically (e.g., per a timer, after a change, upon closing, etc.) and/or saving a template file manually.

As an example, a method can include rendering a graphical user interface (GUI) to a display where the GUI includes graphical controls that correspond to windows and objects of a computational framework and a windows builder panel; responsive to receipt of instructions via the graphical controls, generating specifications for the windows and the objects; and storing the specifications for the windows and the objects as a template file. In such an example, the specifications can include object parameters for each of a plurality of the objects where the object parameters control rendering of a representation of a corresponding one of the plurality of the objects and/or where the specifications include layout parameters for each of a plurality of the windows where the layout parameters control rendering of a representation of a corresponding one of the plurality of the windows. As mentioned, specifications may control features such as stacking (e.g., stacking order, etc.). For example, where a user may wish to perform a QC process that involves windows to be reviewed in a particular order, specifications may stack the windows in a corresponding order. In such an example, once a portion of the QC process is completed, a user may close a window in a stack such that the next window in the stack is fully visible (e.g., not obscured by the closed window, etc.). As an example, generating specifications can include setting parameters (e.g., setting one or more values of one or more parameters).

As an example, a method can include issuing a query to a computational framework and, in response, receiving a listing of objects, for example, where the listing of the objects includes object parameters for each of a plurality of the objects.

As an example, specifications can include specifications for synchronizing view tool commands for a plurality of windows. For example, where a camera tool is utilized to change a view in one window, that change may be communicated to change a view in another window.

As an example, specifications can include specifications for synchronizing view tool commands for a plurality of windows where, for example, the view tool commands can include one or more camera tool commands for control of angle of view in one or more of the windows. For example, consider a 3D window with a camera tool that can be positionable according to one or more parameter settings (e.g., specifications) to provide an angle of view of a spatial rendering based on one or more objects.

As an example, a method can include setting one or more specifications that include specifications for one or more camera tools that control angle of view in one or more of the windows.

As an example, graphical controls can include one or more copy and paste controls, for example, for a defined style for a window and/or for a given object in a 3D window or another type of window. As an example, such controls may be available in a building stage (e.g., to build a template using a builder framework) and/or in a utilization stage (e.g., to alter a template).

As an example, a GUI can include a workflow panel, where specifications for windows and objects relate to a graphical representation of a workflow rendered in the workflow panel. As mentioned, such a workflow can be a QC workflow (e.g., process). As mentioned, where a window is closed, that may signal that a workflow can progress to a subsequent portion of the workflow, which may include utilizing the same template for renderings and/or utilizing a different template for renderings. As an example, a template or templates can correspond to one or more actions associated with a workflow as may be visualized in a builder framework. Such a process can facilitate execution of the workflow.

As an example, windows of a computational framework can include different types of windows. For example, consider window that include at least one of a map window, a 2D window and a 3D window.

As an example, an object can be an object that represents a subsurface structure. For example, consider a well object, a horizon object, a salt body object, a fault object, a fracture object, a well log object, a BHA object, a completion object, etc.

As an example, specifications can include a color specification for rendering a representation of one of a plurality of objects.

As an example, a method can include configuring a computational framework according to a template file as built using a builder framework (e.g., builder tool, etc.). In such an example, the method can include rendering two or more windows of the computational framework in an arrangement specified by the specifications as stored in the template file.

As an example, a GUI can include graphical controls that correspond to windows and objects of two or more different computational frameworks. In such an example, a method can include generating specifications for the windows and objects by generating specifications for the computational frameworks. As an example, a method can include rendering windows and objects using computational frameworks where the windows and objects are rendered according to specifications for the windows and objects as stored in a template file.

As an example, one of a plurality of windows can be a 3D model window and another one of the plurality of windows can be a 2D seismic image window. In such an example, specifications of a template file can specify a color for a horizon rendered to the 3D model window and the 2D seismic image window.

As an example, a system can include a processor; memory accessible to the processor; processor-executable instructions stored in the memory and executable by the processor to instruct the system to: render a graphical user interface (GUI) to a display where the GUI includes graphical controls that correspond to windows and objects of a computational framework and a windows builder panel; responsive to receipt of instructions via the graphical controls, generate specifications for the windows and the objects; and store the specifications for the windows and the objects as a template file.

As an example, one or more computer-readable storage media can include computer-executable instructions executable to instruct a computing system to: render a graphical user interface (GUI) to a display where the GUI includes graphical controls that correspond to windows and objects of a computational framework and a windows builder panel; responsive to receipt of instructions via the graphical controls, generate specifications for the windows and the objects; and store the specifications for the windows and the objects as a template file.

As an example, one or more computer-readable storage media can include processor-executable instructions to instruct a computing system to perform one or more methods. In such an example, the one or more computer-readable storage media can be a program product (e.g., a computer program product, a computer system program product, etc.).

Figure 22:
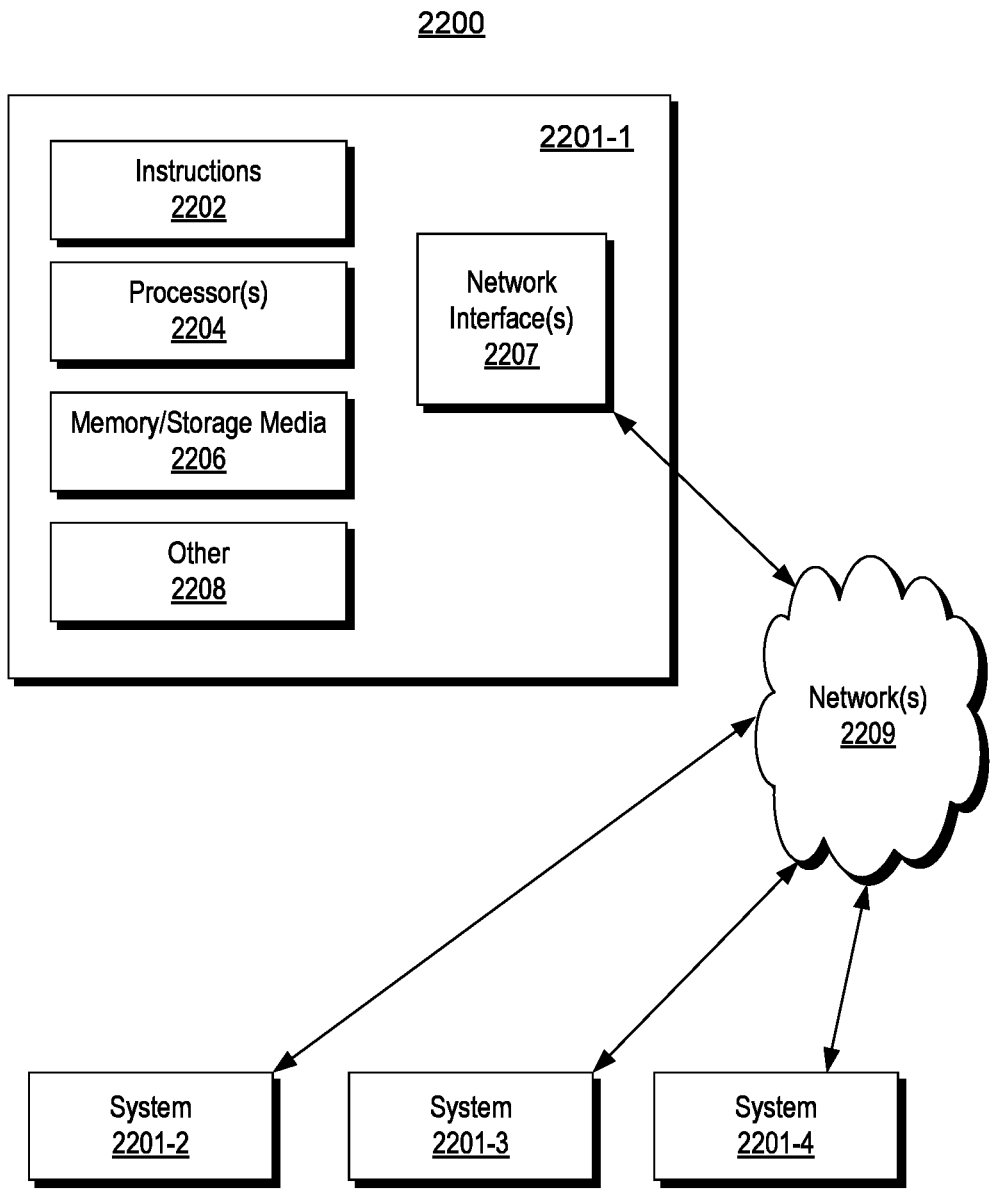
FIG. 22 illustrates examples of computing and networking equipment.

In some embodiments, a method or methods may be executed by a computing system. FIG. 22 shows an example of a system 2200 that can include one or more computing systems 2201-1, 2201-2, 2201-3 and 2201-4, which may be operatively coupled via one or more networks 2209, which may include wired and/or wireless networks.

As an example, a system can include an individual computer system or an arrangement of distributed computer systems. In the example of FIG. 22, the computer system 2201-1 can include one or more sets of instructions 2202, which may be or include processor-executable instructions, for example, executable to perform various tasks (e.g., receiving information, requesting information, processing information, simulation, outputting information, etc.).

As an example, a component, which can be a set of instructions, may be executed independently, or in coordination with, one or more processors 2204, which is (or are) operatively coupled to one or more storage media 2206 (e.g., via wire, wirelessly, etc.). As an example, one or more of the one or more processors 2204 can be operatively coupled to at least one of one or more network interface 2207. In such an example, the computer system 2201-1 can transmit and/or receive information, for example, via the one or more networks 2209 (e.g., consider one or more of the Internet, a private network, a cellular network, a satellite network, etc.).

As an example, the computer system 2201-1 may receive from and/or transmit information to one or more other devices, which may be or include, for example, one or more of the computer systems 2201-2, etc. A device may be located in a physical location that differs from that of the computer system 2201-1. As an example, a location may be, for example, a processing facility location, a data center location (e.g., server farm, etc.), a rig location, a wellsite location, a downhole location, etc.

As an example, a processor may be or include a microprocessor, microcontroller, processor unit or subsystem, programmable integrated circuit, programmable gate array, or another control or computing device.

As an example, the storage media 2206 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 23:
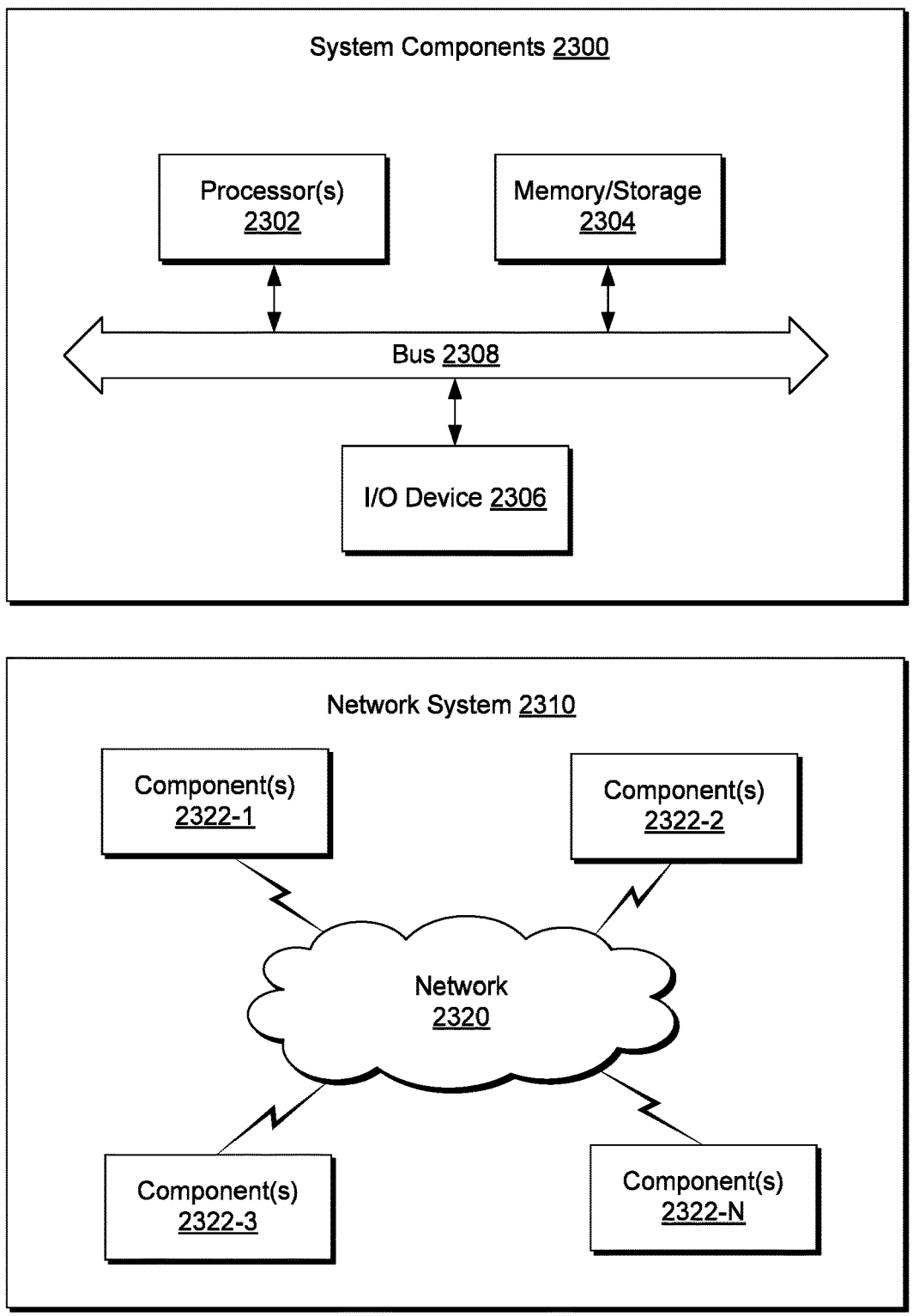
FIG. 23 illustrates example components of a system and a networked system.

FIG. 23 shows components of a computing system 2300 and a networked system 2310. The system 2300 includes one or more processors 2302, memory and/or storage components 2304, one or more input and/or output devices 2306 and a bus 2308. According to an embodiment, instructions may be stored in one or more computer-readable media (e.g., memory/storage components 2304). Such instructions may be read by one or more processors (e.g., the processor(s) 2302) via a communication bus (e.g., the bus 2308), which may be wired or wireless. The one or more processors may execute such instructions to implement (wholly or in part) one or more attributes (e.g., as part of a method). A user may view output from and interact with a process via an I/O device (e.g., the device 2306). According to an embodiment, a computer-readable medium may be a storage component such as a physical memory storage device, for example, a chip, a chip on a package, a memory card, etc.

According to an embodiment, components may be distributed, such as in the network system 2310. The network system 2310 includes components 2322-1, 2322-2, 2322-3, . . . 2322-N. For example, the components 2322-1 may include the processor(s) 2302 while the component(s) 2322-3 may include memory accessible by the processor(s) 2302. Further, the component(s) 2322-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
rendering a graphical user interface (GUI) to a display wherein the GUI comprises graphical controls that correspond to windows and objects of a computational framework, a windows builder panel, and a workflow panel for creation of a graphical representation of tasks of a reservoir engineering workflow, wherein the objects comprise subsurface structural feature objects;
responsive to receipt of instructions via the graphical controls, creating the graphical representation of the tasks in the workflow panel, selecting one of the tasks in the workflow panel, and arranging one of the windows in the windows builder panel, and selecting one of the subsurface structural feature objects for the one of the windows;
generating specifications for the one of the windows and the one of the subsurface structural feature objects for the one of the tasks, wherein the specifications specify an object parameter for the one of the subsurface structural feature objects as renderable to the one of the windows as arranged in the windows builder panel; and
storing the specifications for at least the one of the windows and at least the one of the subsurface structural feature objects as a template file.

2. The method of claim 1 wherein the specifications comprise layout parameters for each of a plurality of the windows wherein the layout parameters control rendering of a representation of a corresponding one of the plurality of the windows.

3. The method of claim 1 comprising issuing a query to the computational framework and, in response, receiving a listing of the objects, wherein the listing of the objects comprises object parameters for each of a plurality of the objects.

4. The method of claim 1 wherein the specifications comprise specifications for synchronizing view tool commands for a plurality of windows.

5. The method of claim 1 wherein the specifications comprise specifications for one or more camera tools that control angle of view in one or more of the windows.

6. The method of claim 1 wherein the windows of the computational framework comprise different types of windows.

7. The method of claim 1 wherein the windows comprise at least one of a map window, a 2D window and a 3D window.

8. The method of claim 1 wherein the object parameter comprises a color specification for rendering a representation of one of the objects.

9. The method of claim 1 comprising configuring the computational framework according to the template file.

10. The method of claim 9 comprising rendering two of the windows of the computational framework in an arrangement specified by the specifications as stored in the template file.

11. The method of claim 1 wherein the GUI comprises graphical controls that correspond to windows and objects of another, different computational framework.

12. The method of claim 11 generating specifications for the windows and the objects generates specifications for the computational frameworks.

13. The method of claim 11 comprising rendering windows and objects using the computational frameworks wherein the windows and objects are rendered according to the specifications for the windows and the objects as stored in the template file.

14. The method of claim 1 wherein one of the windows comprises a 3D model window and another one of the windows comprises a 2D seismic image window.

15. The method of claim 14 wherein the specifications specify a color for a horizon rendered to the 3D model window and the 2D seismic image window.

16. A system comprising:
a processor;
memory accessible to the processor;
processor-executable instructions stored in the memory and executable by the processor to instruct the system to:
render a graphical user interface (GUI) to a display wherein the GUI comprises graphical controls that correspond to windows and objects of a computational framework, a windows builder panel, and a workflow panel for creation of a graphical representation of tasks of a reservoir engineering workflow, wherein the objects comprise subsurface structural feature objects;
responsive to receipt of instructions via the graphical controls, create the graphical representation of the tasks in the workflow panel, select one of the tasks in the workflow panel, arrange one of the windows in the windows builder panel, and select one of the subsurface structural feature objects for the one of the windows:
generate specifications for the one of the windows and the one of the subsurface structural feature objects for the one of the tasks, wherein the specifications specify an object parameter for the one of the subsurface structural feature objects as renderable to the one of the windows as arranged in the windows builder panel; and
store the specifications for at least the one of the windows and at least the one of the subsurface structural feature objects as a template file.

17. One or more non-transitory computer-readable storage media comprising computer-executable instructions executable to instruct a computing system to:
render a graphical user interface (GUI) to a display wherein the GUI comprises graphical controls that correspond to windows and objects of a computational framework, a windows builder panel, and a workflow panel for creation of a graphical representation of tasks of a reservoir engineering workflow, wherein the objects comprise subsurface structural feature objects;
responsive to receipt of instructions via the graphical controls, create the graphical representation of the tasks in the workflow panel, select one of the tasks in the workflow panel, arrange one of the windows in the windows builder panel, and select one of the subsurface structural feature objects for the one of the windows;
generate specifications for the one of the windows and the one of the subsurface structural feature objects for the one of the tasks, wherein the specifications specify an object parameter for the one of the subsurface structural feature objects as renderable to the one of the windows as arranged in the windows builder panel; and
store the specifications for at least the one of the windows and at least the one of the subsurface structural feature objects as a template file.

* * * * *